USO11126598B1

(12) United States Patent
Schechter et al.

(10) Patent No.: US 11,126,598 B1
(45) Date of Patent: Sep. 21, 2021

(54) TECHNIQUES FOR PERFORMING LIFECYCLE OPERATIONS ON A DATA STORE

(71) Applicant: Ab Initio Technology LLC, Lexington, MA (US)

(72) Inventors: Ian Robert Schechter, Sharon, MA (US); David E. Wald, Watertown, MA (US)

(73) Assignee: Ab Initio Technology LLC, Lexington, MA (US)

( * ) Notice: Subject to any disclaimer, the term of this patent is extended or adjusted under 35 U.S.C. 154(b) by 347 days.

(21) Appl. No.: 14/933,359

(22) Filed: Nov. 5, 2015

Related U.S. Application Data

(60) Provisional application No. 62/076,391, filed on Nov. 6, 2014.

(51) Int. Cl.
G06F 16/215 (2019.01)
G06F 16/22 (2019.01)
G06F 16/23 (2019.01)

(52) U.S. Cl.
CPC ............ G06F 16/215 (2019.01); G06F 16/22 (2019.01); G06F 16/2365 (2019.01)

(58) Field of Classification Search
CPC . G06F 17/303; G06F 8/71; G06F 8/65; G06F 21/10; G06F 21/50; G06F 11/3409; G06F 16/215
See application file for complete search history.

(56) References Cited

U.S. PATENT DOCUMENTS

| 5,966,072 | A | 10/1999 | Stanfil et al. | |
| 8,229,902 | B2 | 7/2012 | Vishniac et al. | |
| 2005/0228807 | A1* | 10/2005 | McCauley | G06F 17/30011 |
| 2007/0011668 | A1 | 1/2007 | Wholey et al. | |
| 2008/0104143 | A1* | 5/2008 | Khor | G01R 31/2834 |
| 2010/0023952 | A1* | 1/2010 | Sandoval | G06F 16/258 719/318 |
| 2010/0115490 | A1* | 5/2010 | Wilcock | G06F 8/70 717/104 |
| 2011/0055286 | A1* | 3/2011 | Hailpern | G06F 16/24575 707/804 |
| 2013/0332901 | A1* | 12/2013 | Berg | G06F 8/71 717/121 |
| 2014/0075032 | A1* | 3/2014 | Vasudevan | H04L 41/50 709/226 |

(Continued)

Primary Examiner — Mariela Reyes
Assistant Examiner — Courtney Harmon
(74) Attorney, Agent, or Firm — Wolf, Greenfield & Sacks, P.C.

(57) ABSTRACT

Techniques for allowing a user to invoke lifecycle operations on a data store configured in accordance with a data management scheme, without knowledge of the data management scheme. Techniques include receiving user input from a user interface; identifying, in the received user input, an indication of a first lifecycle operation corresponding to a first entry in a template; based on information in the first entry, identifying in the received user input a first configuration value associated with the first lifecycle operation; formatting the first configuration value as at least a portion of at least one argument to a first command; and invoking, via the first command with the at least one argument, a first computer program configured to perform the first lifecycle operation on the data store.

35 Claims, 14 Drawing Sheets

(56) References Cited

U.S. PATENT DOCUMENTS

2014/0172939 A1* 6/2014 McSherry ......... H04L 29/08135
  709/201
2016/0019117 A1* 1/2016 Kumarasamy ...... G06F 11/1417
  707/650

* cited by examiner

```
<Command name="create-table" enabled="true">
  <Executable executable_type="Program" working_directory="${AI_RUN}">
    <CommandLine is_expression="true"><![CDATA[
    begin
      let string(int)[int] args = [vector "${AI_BIN}/ab-qe", "create", "table", "-table", table, "-compile", '-sql', '-ds-catalog', ds_catalog];
        if ("partition" member arguments)
          args = vector_concat(args, [vector "-timestamp", partition]);
        if ("dmltype" member arguments)
          args = vector_concat(args, [vector "-type", dmltype]);
        if ("dmlfile" member arguments)
          args = vector_concat(args, [vector "-file", dmlfile]);
        if ("sql_name" member arguments)
          args = vector_concat(args, [vector "-sql-name", sql_name]);
        if ("sql_schema" member arguments)
          args = vector_concat(args, [vector "-sql-schema", sql_schema]);
        if ("sql_dataspace" member arguments)
          args = vector_concat(args, [vector "-sql-dataspace", sql_dataspace]);
        for (let i in index)
          args = vector_concat(args, [vector "-index", i]);
        result :: args;
    end
    ]]></CommandLine>
  </Executable>
</Command>
```

FIG. 4A

```
<Command name="create-volume" enabled="true">
  <Executable executable_type="Program" working_directory="${AI_RUN}">
    <CommandLine is_expression="true"><![CDATA[
      begin
              402      404
        let string(int)[int] args = [vector "${AI_BIN}/ab-qe", "create", "volume", "-table",
        table];
                                                                          408
        410
        if ("volume" member arguments)
          args = vector_concat(args, [vector "-date", volume]);

if ("from" member arguments)
          args = vector_concat(args, [vector "-from", from]);

if ("to" member arguments)                                  406
          args = vector_concat(args, [vector "-to", to]);

result :: args;
      end
    ]]></CommandLine>
  </Executable>
</Command>
```

FIG. 4B

```
<Command name="delete-volume" enabled="true">
  <Executable executable_type="Program" working_directory="${AI_RUN}">
    <CommandLine is_expression="true"><![CDATA[
      begin
        let string(int)[int] args = [vector "${AI_BIN}/ab-qe", "delete", "volume", "-table", table];
          if ("volume" member arguments)
            args = vector_concat(args, [vector "-date", volume]);
          else
            begin
              if ("from" member arguments)
                args = vector_concat(args, [vector "-from", from]);
              if ("to" member arguments)
                args = vector_concat(args, [vector "-to", to]);
            end
          result :: args;
      end
    ]]></CommandLine>
  </Executable>
</Command>
```

FIG. 4C

```
<Command name="create-index" enabled="true">
  <Executable executable_type="Program">
    <CommandLine is_expression="true">
      [vector "${AI_BIN}/ab-qe", "create", "index", "-table", table, "-index", index, '-compile', '-sql', '-ds-catalog', ds_catalog]
    </CommandLine>
  </Executable>
</Command>
```

FIG. 4D

```
<Command name="delete-table" enabled="true">
  <Executable executable_type="Program">
    <CommandLine is_expression="true">
      [vector "${AI_BIN}/ab-qe", "delete", "table", "-table", table, "-force"]
    </CommandLine>
  </Executable>
  <Executable executable_type="Program" working_directory="${AI_RUN}">
    <CommandLine>
      ${AI_BIN}/ab-qe compile schema -sql
    </CommandLine>
  </Executable>
</Command>
```

FIG. 4E

```
<Command name="list-files" enabled="true">
 <Executable>
  <CommandLine is_expression="true"><![CDATA[
    begin
      let string(int)[int] args = [vector "${AI_BIN}/ab-qe", "show", "datastore", "-qi-volume-info"];
      if ("table" member arguments)
        args = vector_concat(args, [vector "-table", table]);
      if ("output_file" member arguments)
        args = vector_concat(args, [vector "-output-file", output_file]);
      result :: args;
    end
  ]]></CommandLine>
 </Executable>
</Command>
```

FIG. 4F

```
<Command name="validate-table" enabled="true">
  <Executable>
   <CommandLine is_expression="true"><![CDATA[
    begin
      let string(int)[int] args = [vector "${AI_BIN}/ab-qe", "show", "datastore", "-table", table, "-skip-sizes",
"-skip-divisions"];
      if ("volume" member arguments)
       args = vector_concat(args, [vector "-date", volume]);
      result :: args;
     end
   ]]></CommandLine>
  </Executable>
</Command>
```

FIG. 4G

TECHNIQUES FOR PERFORMING LIFECYCLE OPERATIONS ON A DATA STORE

This Application claims priority under 35 U.S.C. § 119(e) to U.S. Provisional Application Ser. No. 62/076,391, entitled "TECHNIQUES FOR PERFORMING LIFECYCLE OPERATIONS ON A DATA STORE" filed on Nov. 6, 2014.

BACKGROUND

A data processing system may manage data using a data management scheme. For example, a data store in a data processing system may be configured in accordance with a data management scheme under which call records are stored in blocks of call records corresponding to the days on which the calls were made, in blocks of call records corresponding to the area codes from which the calls were made, in blocks of call records corresponding to names of parties conducting the calls, or using any other suitable data management scheme. Further, information in the data store may be distributed across storage objects, such as tables or files, so that information in certain fields is stored in a different object than other related fields. For example, phone call records may be stored in multiple tables, with name and address information being stored in a different table than information identifying a phone number called.

Various lifecycle operations may be performed on a data store, including creating a table for storing data, deleting a table, adding a volume to a table, deleting a volume from a table, etc. Because the data management scheme may be part of the data processing system, computer programs may be built into the data processing system to perform lifecycle operations on the data store in accordance with the data management scheme for the data store. For example, commands to add or delete a table may be included in a database management system that has a known data management scheme.

Some data processing systems may be configured to manage data using any one of multiple different data management schemes. Those data processing systems may have computer programs for performing lifecycle operations according to one data management scheme, which may be a standard data management scheme. Sophisticated users of the data processing system may nonetheless make use of the flexibility afforded by multiple data management schemes and configure the data processing system to use a data management scheme other than the standard data management scheme.

SUMMARY

The present application describes lifecycle operations performed on a data store. Some embodiments provide for a method for performing one or more lifecycle operations on a data store. The method comprises using at least one computer hardware processor to perform: receiving user input comprising information identifying a first lifecycle operation to perform on the data store and a configuration value for the first lifecycle operation; accessing information in a template based at least in part on the information identifying the first lifecycle operation, wherein the template links information identifying at least one lifecycle operation to information used for generating at least one command for invoking at least one computer program configured to operate in the data store that, when executed, causes the at least one lifecycle operation to be performed on the data store; generating, based at least in part on the accessed information in the template, a first command for invoking a first computer program of the at least one computer program to perform the first lifecycle operation on the data store, the first command comprising a reference to the first computer program, and at least one argument for the first command to provide to the first computer program, the at least one argument being based on the configuration value; and executing the first command to invoke the first computer program with the at least one argument to perform the first lifecycle operation on the data store.

Some embodiments provide for a system for use with (i) a data store; (ii) at least one computer program configured to perform at least one lifecycle operation on the data store; (iii) a template linking information identifying at least one lifecycle operation to information used for generating at least one command for invoking at least one computer program configured to operate on the data store that, when executed, causes the at least one lifecycle operation to be performed on the data store. The system comprises: at least one computer hardware processor; and at least one non-transitory computer-readable storage medium storing processor-executable instructions that, when executed by the at least one computer hardware processor, cause the at least one computer hardware processor to perform: receiving user input comprising information identifying a first lifecycle operation to perform on the data store and a configuration value for the first lifecycle operation; accessing information in the template based at least in part on the information identifying the first lifecycle operation; generating, based at least in part on the accessed information in the template, a first command for invoking a first computer program of the at least one computer program to perform the first lifecycle operation on the data store, the first command comprising a reference to the first computer program, and at least one argument for the first command to provide to the first computer program, the at least one argument being based on the configuration value; and executing the first command to invoke the first computer program with the at least one argument to perform the first lifecycle operation on the data store.

Some embodiments provide for at least one non-transitory computer-readable storage medium storing processor-executable instructions for execution on at least one computer hardware processor of a data processing system comprising: (i) a data store, (ii) at least one computer program configured to perform at least one lifecycle operation on the data store, and (iii) a template linking information identifying at least one lifecycle operation to information used for generating at least one command for invoking at least one computer program configured to operate on the data store that, when executed, causes the at least one lifecycle operation to be performed on the data store, the processor-executable instructions, when executed by the at least one computer hardware processor, cause the at least one computer hardware processor to perform: receiving user input comprising information identifying a first lifecycle operation to perform on the data store and a configuration value for the first lifecycle operation; accessing information in the template based at least in part on the information identifying the first lifecycle operation; generating, based at least in part on the accessed information in the template, a first command for invoking a first computer program of the at least one computer program to perform the first lifecycle operation on the data store, the first command comprising a reference to the first computer program, and at least one argument for the first command to provide to the first computer program, the at least one argument being based on the configuration value; and executing the first command to invoke the first computer program with the at least one argument to perform the first lifecycle operation on the data store.

Some embodiments provide for at least one non-transitory computer-readable storage medium storing processor-executable instructions for execution on at least one computer hardware processor of a data processing system comprising: (i) a data store, (ii) at least one computer program configured to perform at least one lifecycle operation on the data store, and (iii) a template linking information identifying at least one lifecycle operation to information used for generating at least one command for invoking at least one computer program configured to operate on the data store, the processor-executable instructions comprising: means for receiving user input comprising information identifying a first lifecycle operation to perform on the data store and a configuration value for the first lifecycle operation; means for accessing information in the template based at least in part on the information identifying the first lifecycle operation; means for generating, based at least in part on the accessed information in the template, a first command for invoking a first computer program of the at least one computer program to perform the first lifecycle operation on the data store, the first command comprising a reference to the first computer program, and at least one argument for the first command to provide to the first computer program, the at least one argument being based on the configuration value; and means for executing the first command to invoke the first computer program with the at least one argument to perform the first lifecycle operation on the data store.

Some embodiments provide for a method of operating a computer system to perform one or more lifecycle operations on a data store. The method comprises using at least one computer hardware processor to perform: receiving user input from a user interface; identifying, in the received user input, an indication of a first lifecycle operation corresponding to a first entry in a template; based on information in the first entry, identifying in the received user input a first configuration value associated with the first lifecycle operation; formatting the first configuration value as at least a portion of at least one argument to a first command; and invoking, via the first command with the at least one argument, a first computer program configured to perform the first lifecycle operation on the data store.

Some embodiments provide for at least one non-transitory computer-readable storage medium storing processor-executable instructions for execution on at least one computer hardware processor of a data processing system comprising: (i) a data store; (ii) at least one computer program configured to perform at least one lifecycle operation on the data store; and (iii) a template comprising a plurality of entries including a first entry, the processor-executable instructions, when executed by the at least one computer hardware processor, cause the at least one computer hardware processor to perform:
receiving user input from a user interface;
identifying, in the received user input, an indication of a first lifecycle operation corresponding to a first entry in the template; based on information in the first entry, identifying in the received user input at least one configuration value associated with the first lifecycle operation; formatting the at least one configuration value as at least a portion of at least one argument to a first command; and invoking, via the first command with the at least one argument, a first computer program of the at least one computer program, the first computer program configured to perform the first lifecycle operation on the data store.

Some embodiments provide for a method for facilitating performing one or more lifecycle operations on a data store. The method comprises using at least one computer hardware processor to perform: based at least in part on user input provided by a first user: creating at least one computer program configured to perform at least one lifecycle operation on the data store in response to a respective at least one command; and creating a template comprising, for a first lifecycle operation of the at least one lifecycle operation, information that links information identifying the first lifecycle operation with information used for generating at least one command for invoking the at least one computer program; storing the at least one computer program and the template on at least one non-transitory computer readable storage medium; and associating the created template with the data store such that, when a second user provides input indicating that the first lifecycle operation is to be performed in the data store, the template is used to generate a first command and the first command is used to invoke a first computer program of the at least one computer program to perform the first lifecycle operation.

Some embodiments provide for at least one non-transitory computer readable storage medium storing processor executable instructions to be executed by at least one computer hardware processor of a system for facilitating performing one or more lifecycle operations on a data store, the processor-executable instructions, when executed by the at least one computer hardware processor, cause the at least one computer hardware processor to perform: based at least in part on user input provided by a first user: creating at least one computer program configured to perform at least one lifecycle operation on the data store in response to a respective at least one command; and creating a template comprising, for a first lifecycle operation of the at least one lifecycle operation, information that links information identifying the first lifecycle operation with information used for generating at least one command for invoking the at least one computer program; storing the at least one computer program and the template on at least one non-transitory computer readable storage medium; and associating the created template with the data store such that, when a second user provides input indicating that the first lifecycle operation is to be performed in the data store, the template is used to generate a first command and the first command is used to invoke a first computer program of the at least one computer program to perform the first lifecycle operation.

Some embodiments provide for a method for performing one or more lifecycle operations on at least one data store in a data management system, the at least one data store comprising a first data store configured in accordance with a first data management scheme, and second data store configured in accordance with a second data management scheme different from the first data management scheme. The method comprises using at least one computer hardware processor to perform: receiving first user input comprising information identifying a first lifecycle operation to perform on the first data store; accessing information in a first template based at least in part on the information identifying the first lifecycle operation, wherein the first template links information identifying the first lifecycle operation to information used for generating a first command for invoking a first computer program configured to perform the first lifecycle operation on the first data store in accordance with the first data management scheme; generating, based at least in part on the accessed information in the first template, the first command for invoking the first computer program, the first command comprising a reference to the first computer program, and a first argument for the first command to provide to the first computer program; and executing the first command to invoke the first computer program with the first argument to perform the first lifecycle operation on the data store.

Some embodiments provide for at least one non-transitory computer readable storage medium storing processor executable instructions that, when executed by at least one computer hardware processor, cause the at least one computer hardware processor to perform a method for performing one or more lifecycle operations on at least one data store in a data management system, the at least one data store comprising a first data store configured in accordance with a first data management scheme, and second data store configured in accordance with a second data management scheme different from the first data management scheme. The method comprises receiving first user input comprising information identifying a first lifecycle operation to perform on the first data store; accessing information in a first template based at least in part on the information identifying the first lifecycle operation, wherein the first template links information identifying the first lifecycle operation to information used for generating a first command for invoking a first computer program configured to perform the first lifecycle operation on the first data store in accordance with the first data management scheme; generating, based at least in part on the accessed information in the first template, the first command for invoking the first computer program, the first command comprising a reference to the first computer program, and a first argument for the first command to provide to the first computer program; and executing the first command to invoke the first computer program with the first argument to perform the first lifecycle operation on the data store.

Some embodiments provide for a data management system comprising: a first data store configured in accordance with a first data management scheme; a second data store configured in accordance with a second data management scheme different from the first data management scheme; and at least one computer hardware processor configured to perform: receiving first user input comprising information identifying a first lifecycle operation to perform on the first data store; accessing information in a first template based at least in part on the information identifying the first lifecycle operation, wherein the first template links information identifying the first lifecycle operation to information used for generating a first command for invoking a first computer program configured to perform the first lifecycle operation on the first data store in accordance with the first data management scheme; generating, based at least in part on the accessed information in the first template, the first command for invoking the first computer program, the first command comprising a reference to the first computer program, and a first argument for the first command to provide to the first computer program; and executing the first command to invoke the first computer program with the first argument to perform the first lifecycle operation on the data store.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIGS. 4A-4G illustrate template entries corresponding to lifecycle operations, in accordance with some embodiments of the technology described herein.

DETAILED DESCRIPTION

Figure 1A:
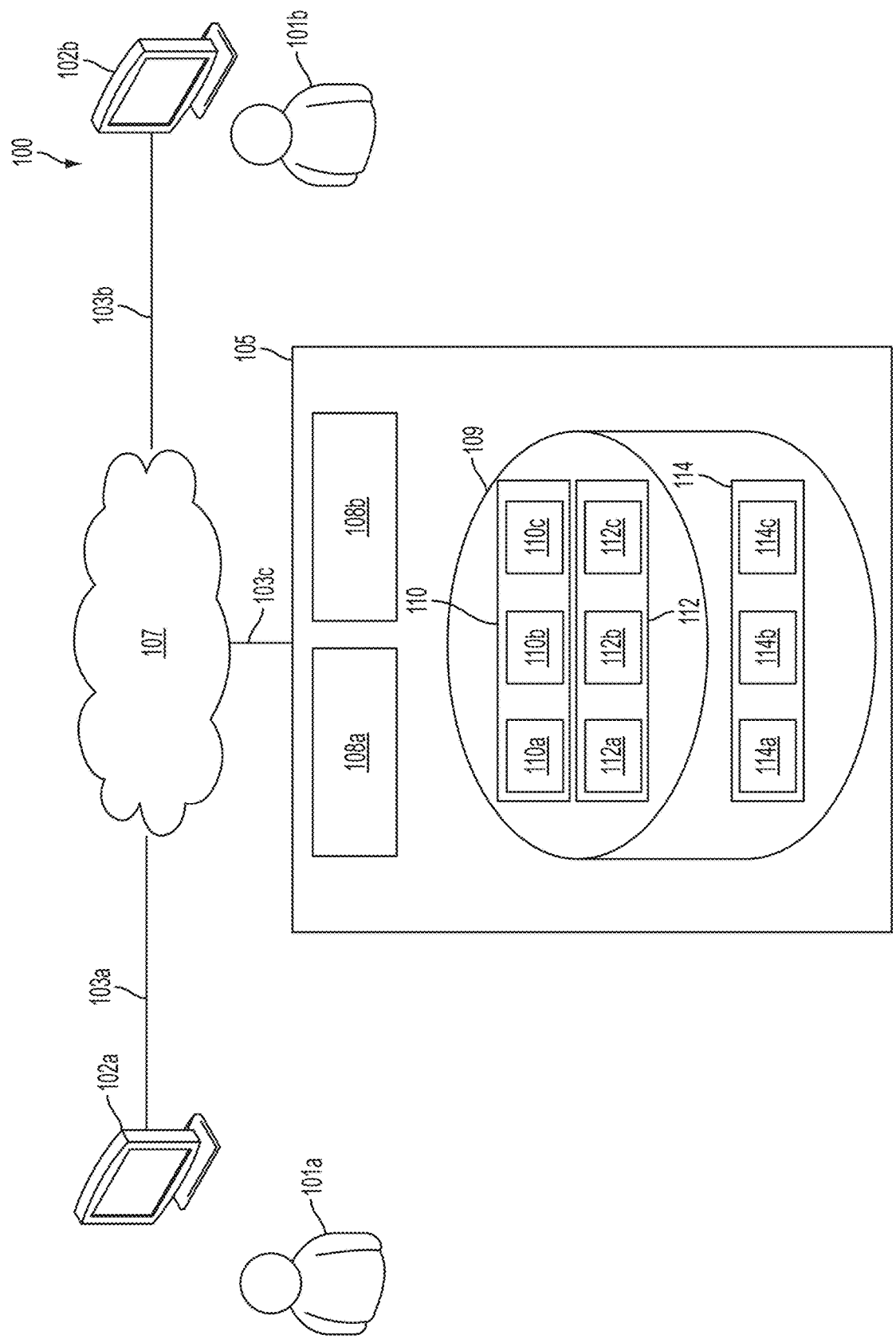
FIG. 1A is a block diagram of an illustrative environment, in which some embodiments of the technology described herein may operate.

Aspects of the technology described herein relate to increasing efficiency and reducing errors in operation of a data processing system, including those that may be configured in accordance with a data management scheme. The inventors have recognized that, for a data store for which a data management scheme was previously established by one or more other users, a user attempting to perform lifecycle operations on the data store may do so incorrectly, resulting in inaccurate and unreliable data in the data store.

For example, a first user, such as an administrator of the data processing system, may configure the data store in accordance with a particular data management scheme designed to provide efficient access to data of the type to be held in the data store. In order to correctly perform a lifecycle operation, a second user may need to know and understand how to apply the data management scheme to specify particular operations that are to be performed on the data store. However, information about the data management scheme may not be readily available to the second user. That data management scheme may be reflected in computer programs that access the data store to process data, but deriving the data scheme from the programs may require complex reverse engineering of the programs or other analysis.

As a result, the second user may unknowingly introduce errors in the data processing system by attempting to perform a lifecycle operation on the data store. Alternatively, out of concern for avoiding such errors, the first user may be forced to use a predefined data management scheme. However, applying the predefined data management scheme may lead to inefficient operation of the data processing system for the specific data processing tasks. Many data processing systems operate on large quantities of data and must be able to quickly produce accurate results. For example, a data processing system operated by a credit card company may process data related to numerous credit card transactions. Speed and accuracy of processing data representing each transaction is therefore very important.

The inventors have recognized that inaccuracies may be avoided and greater efficiency in operation of the data processing system may be achieved by enabling a first user, configuring a data management scheme for a data store, to record information sufficient to enable a second user to invoke (e.g., at a later time) one or more lifecycle operations on the data store. That information may include one or more computer programs that, when invoked, perform a lifecycle operation on the data store. In addition, that information may include a template storing information that can be used for building a command to invoke the computer program(s). The template may indicate how such a command is to be formatted and may identify the arguments for the command.

In some embodiments, the data processing system may provide for a user interface through which a user (e.g., the second user in the above example) may invoke one or more lifecycle operations. That user interface may accept, as input, information identifying a lifecycle operation to perform on a data store and values of one or more configuration parameters for performing the lifecycle operation. This information may be independent of the data management scheme for the data store. Using this input, in combination with the template, the data processing system may format a command having arguments as specified by the user input. The system may then invoke an appropriate computer program, with arguments based on input from the user that performs the lifecycle operation on the data store. As a result, the second user can invoke commands that perform lifecycle operations on the data store, which are dependent on the data management scheme of that data store, without the second user needing to know that data management scheme.

Accordingly, some embodiments are directed to techniques for allowing a user to perform a lifecycle operation on a data store without requiring the user to obtain and understand detailed information about the data management scheme used for managing data in the data store. For example, the techniques allow the user to perform a lifecycle operation without requiring him/her to figure out what command to execute, or how to format the command, in order to perform the lifecycle operation. In some embodiments, when a first user (e.g., an administrator) configures a data store in accordance with a particular data management scheme, the first user may create a corresponding template that contains information linking lifecycle operations to respective commands that, when executed, invoke appropriate computer programs (with appropriate arguments) to perform the lifecycle operations. The template may be implemented in any suitable way, such as by storing the linking information as configuration data in any other suitable format, such as one or more configuration files. The linking information may also be in any suitable form. In some embodiments, the linking information may be a name of a lifecycle operation stored in a way that defines an association to a program that can perform that operation for a data store for a data processing system with a particular configuration.

The created template may be stored for subsequent use. When another user indicates a desire to perform a lifecycle operation, the data processing system may use the template to generate a command that, when executed, invokes the computer program(s) to perform the desired lifecycle operation. The user may provide one or more configuration values for the lifecycle operation and information in the template may be used to format the value(s) as arguments to the command. For example, when the user indicates his/her desire to add a volume to a table via a graphical user interface, the data processing system may use the template to generate a command that, when executed, invokes the computer program to add a volume to a table in the data store. The user may provide one or more configuration values for the create volume lifecycle operation, such as values indicating the table to which to add the volume and the size of the volume, and information in the template may be used to format the configuration value(s) as arguments to the command. In this way, the user need only provide an indication, in a format independent of the data management scheme used for the data store, that he/she desires the lifecycle operation to be performed and does not need to obtain and understand detailed and complicated instructions about how to invoke programs to perform the lifecycle operation, which improves the user's experience, avoids errors that might result from incorrectly specifying the manner in which the lifecycle operation is to be performed and enables non-standard configurations, which may lead to more efficient operation of the data processing system.

In some embodiments, the template may contain entries that correspond to multiple lifecycle operations. Associated with each entry may be an identification of a computer program that can be invoked to perform a lifecycle operation. The entry may link that program to an identification of a lifecycle operation that may be received through a user interface, such that when an indication of that lifecycle operation is received through the user interface, the data processing system may select the appropriate entry, which may in turn lead to selecting the appropriate computer program(s) to perform the lifecycle operation.

Other information in an entry may indicate configuration values that may be passed to the program linked to life cycle operation corresponding to that entry. The template may record information linking these configuration values to values that may be input through the user interface. The system may use information in the template to format configuration values input through the user interface as arguments for a command to invoke the program that performs the lifecycle operation. In this way, a user may input an indication of a lifecycle operation for a data store and configuration values for performance of that operation in a common manner regardless of the data management scheme used for the data store.

In some embodiments, a lifecycle operation that can be performed on a data store may be any operation for managing the way in which data is stored in the data store. For example, a lifecycle operation may be an operation on a data store that creates, deletes, or alters one or more structures used for managing data in the data store. As another example, a lifecycle operation may be an operation on a data store that provides information about how data is managed in a data store. By contrast, an operation that merely reads data stored in a data store or writes data to a data store (e.g., reading data from a table and writing data into a table) is not a lifecycle operation. Examples of lifecycle operations include, but are not limited to, creating a table for storing data in a data store (a "create table" lifecycle operation), deleting a table from the data store (a "delete table" lifecycle operation), adding a volume to a table in the data store (an "add volume" lifecycle operation), and deleting a volume from a table in the data store (a "delete volume" lifecycle operation), obtaining information about one or more volumes (e.g., a "list volumes" lifecycle operation for listing the volumes associated with a table, listing information about volumes associated with a table, etc.) of a table in the data store, obtaining information about one or more files storing information in the data store (a "list files" lifecycle operation, creating an index for data in a data store (a "create index" lifecycle operation), and validating a table (a "validate table" lifecycle operation).

FIG. 1A is a block diagram of an illustrative environment 100 in which some embodiments of the technology described herein may operate. Environment 100 includes a data processing system 105, which comprises interfaces 108a and 108b that users may use to interact with the data processing system. Data processing system 105 also comprises storage 109 storing: (i) data stores 114 for managing data including data stores 114a-c; (ii) templates 112 associated with data stores 114 including templates 112a-c associated with data stores 114a-c, and computer programs 110 including computer programs 110a-c for performing (e.g., lifecycle) operations on the data stores 114. Different data stores of data processing system 105 may store different types of data (e.g., data for different applications). For example, data store 114a may store credit card transactions data, data store 114b may store phone records data, and data store 114c may store bank transactions data. Although in the illustrated embodiment data processing system 105 is shown as having three data stores and three associated templates, a data processing system may comprise any suitable number of data stores and templates, as aspects of the technology described herein are not limited in this respect.

User 101a may use computing device 102a to configure data processing system 105 for use in connection with a particular application. For example, user 101a may configure data processing system 105 to manage data associated with the particular application. For instance, user 101a may configure data processing system 105 to manage transactional data such as credit card transactions, phone call records, bank transactions, and the like. So that the data managed by the data processing system may be accessed efficiently, user 101a may configure data processing system 105 to manage data in accordance with a data management scheme designed to provide efficient access to the managed data. Configuring data processing system 105 to manage data in accordance with a data management scheme may comprise configuring a data store of the data processing system 105 with the data management scheme.

In addition to configuring a data store (e.g., data store 114a) of the data processing system 105 in accordance with a particular data management scheme, user 101a may create a template for the data store (e.g., template 112a) that contains information linking lifecycle operations to information used for generating respective commands that, when executed, invoke appropriate computer programs (with appropriate arguments) to perform the lifecycle operations on the data store. When another user, such as user 101b that interacts with data processing system 105 via computing device 101b, indicates a desire to perform a lFifecycle operation on the data store, the data processing system may use the template created by user 101a to generate a command that, when executed, invokes the computer program(s) to perform the desired lifecycle operation. In this way, user 101b (who may be at a different location than user 101a and may be interacting with data processing system 105 at a different time from that of user 101a) may invoke lifecycle operations to be performed on data stores of the data processing system without knowing details of how the data processing system manages data in the data stores.

As may be appreciated from the foregoing, data processing system 105 is configured to use templates 112 to generate, based on user input specifying lifecycle operations to perform on data stores 114, commands used to invoke computer program(s) (e.g., computer programs among computer programs 110) to perform the lifecycle operations on the data stores 114 in accordance with the data management scheme(s) for the data stores 114. For example, a user (e.g., user 101b) may provide input specifying a lifecycle operation to perform on data store 114a and one or more configuration values for the lifecycle operation, and the data processing system 105 may use information in template 112a to generate a command used to invoke a particular computer program (e.g., computer program 110a) to perform the specified lifecycle operation on data store 114a along with arguments for the command that reflect the specified configuration value(s). The particular computer program may be configured to perform the specified lifecycle operation in accordance with the data management scheme of data store 114a.

The data processing system 105 may execute the generated commands to perform the specified lifecycle operations on the data stores 114. For example, data processing system 105 may use template 112a to generate one or more commands to invoke computer program(s) to perform one or more lifecycle operations on data store 114a and execute the generated command(s) to perform the lifecycle operation(s). As another example, data processing system 105 may use template 112b to generate one or more commands to invoke computer program(s) to perform one or more lifecycle operations on data store 114b and execute the generated command(s) to perform the lifecycle operation(s).

As discussed above, templates 112 allow users to specify lifecycle operations to perform on data stores 114 without requiring the users to obtain and understand detailed and complicated instructions about how to invoke computer programs to perform the lifecycle operations. For example, template 112a may comprise information that allows a user (e.g., user 101b) to invoke lifecycle operations on data store 114a without having to obtain and understand detailed information about how to invoke computer programs that will perform the lifecycle operations on data store 114a. The user need only provide an indication of the lifecycle operation desired and that indication together with the information stored in template 112a may be used to generate a command to invoke the computer program to perform the desired lifecycle operation on data store 114a.

Figure 1B:
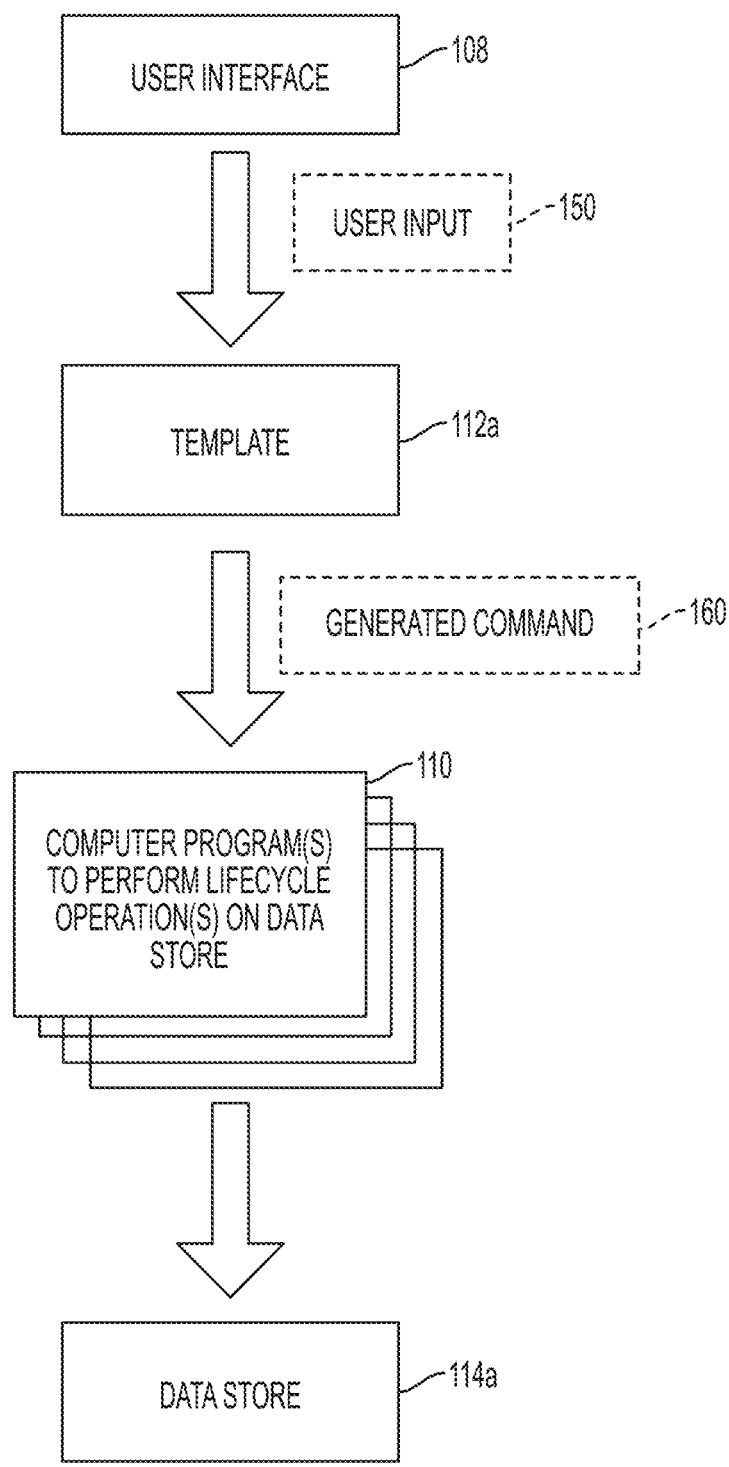
FIG. 1B illustrates the processing performed when a user provides input indicating that a lifecycle operation on a data store is to be performed, in accordance with some embodiments of the technology described herein.

An illustrative example of processing performed by data processing system 105 to perform a lifecycle operation is shown in FIG. 1B. As illustrated, a user may provide, via user interface 108b, user input 150 specifying a particular lifecycle operation to perform on data store 114a. User input 150 may also specify one or more configuration values for performing the lifecycle operation. For example, user input may specify that a "create table" operation is to be performed on data store 114a and a configuration value indicating a key field by which to index data stored in the created table so that the data processing system 105 may manage data in the created table using a data management scheme using which data in the table may be accessed efficiently using the key field. Although the user may not know details of the data management scheme used to manage data in the created table, the user's input influences the type of data management scheme used to manage data in the created table so that the data may be accessed efficiently by using the key field. Data processing system 105 may use template 112*a* and user input 150 to generate a command 160 used to invoke a computer program 110 (e.g., one or more of computer programs 110, for example computer program 110*a*) to perform the specified lifecycle operation on data store 114*a*.

Data processing system 105 may manage data in one or more data stores (e.g., data stores 114*a*, 114*b*, 114*c*, etc.) in accordance with any suitable data management scheme(s). Managing data in accordance with a data management scheme may comprise storing data in accordance with the scheme (e.g., the data management scheme may indicate how the data in the data store is to be stored on disk or any other suitable tangible storage medium or media), indexing data in accordance with the scheme (e.g., the data management scheme may indicate how the data is to be indexed for access, for example, by specifying one or more keys used for indexing the data), and/or accessing data in accordance with the scheme (e.g., the data management scheme may indicate procedures for how to access data in the data store efficiently).

In some embodiments, a data store may be configured in accordance with any one of multiple different data management schemes. Thus, a data store may be configured in one way based on one data management scheme and in a different way based on another data management scheme. As described above, the data management scheme may be selected for a data store based on the efficiency of access it provides to data in the data store. For example, the data store may be configured to store and index data in blocks of data units corresponding to any one of multiple key fields and the key field may be selected based on the efficiency of access to the data provided by the resultant storage scheme. A data unit may comprise data corresponding to a transaction such as a phone call or a credit card transaction. As one example, according to one data management scheme, the data store may be configured to store and index phone call records in blocks of data units corresponding to the days on which the calls were made. According to another data management scheme, the data store may be configured to store and index phone call records in blocks of data units corresponding to the area codes from which the calls were made. According to yet another data management scheme, the data store may be configured to store and index phone call records in blocks of data units corresponding to names of parties conducting the call. Accordingly, if phone call records are to be accessed most often based on days on which the calls were made, the first of the above data management schemes may be selected so that the data store is configured to store and index phone call records in blocks of data units corresponding to the days on which the calls were made.

As may be appreciated from the above example, in some embodiments, a data processing system may manage data in a data store using multiple objects and associated indexing information. For example, data in a data store may comprise multiple data units and the objects may be blocks of data units. Data units may be sorted by a key value that identifies each data unit and divided into blocks of data units that correspond to non-overlapping ranges of (e.g., a predetermined number of) key values. For example, phone call records may be sorted by the area code from which the calls originated and be divided into blocks having a predetermined number of data units (e.g., at least 105 data units, at least 500 data units, at least 1,000 data units, at least 5,000 data units, at least 10,000 data units, at least 25,000 data units, between 500 and 2,500 data units, between 1,000 and 5,000 data units, etc.). As another example, phone call records may be sorted by the date on which the calls were made and be divided into blocks having a predetermined number of data units. Each block of data units may be stored in data unit storage (e.g., one or more non-transitory storage media such as one or more hard disk drives). Each block may be compressed and/or encrypted prior to being stored in the data unit storage.

In embodiments where a data processing system manages data in a data store using multiple objects comprising data units, the multiple objects may be associated with indexing information that may be used to efficiently locate an object and/or one or more data units inside the object. For example, in embodiments where a data processing system manages data in a data store using multiple blocks of records, the multiple blocks may be associated with indexing information that may be used to efficiently locate a block and/or one or more records inside the block. The indexing information may be stored separately from the objects themselves (e.g., in a separate file or files). In some instances, the indexing information may be stored using the same storage medium or media as the objects (e.g., one or more hard disks). In other instances, the indexing information may be stored in a storage medium/media (e.g., RAM) that may be accessed faster than the medium/media on which the objects are stored (e.g., one or more hard disks).

Figure 2:
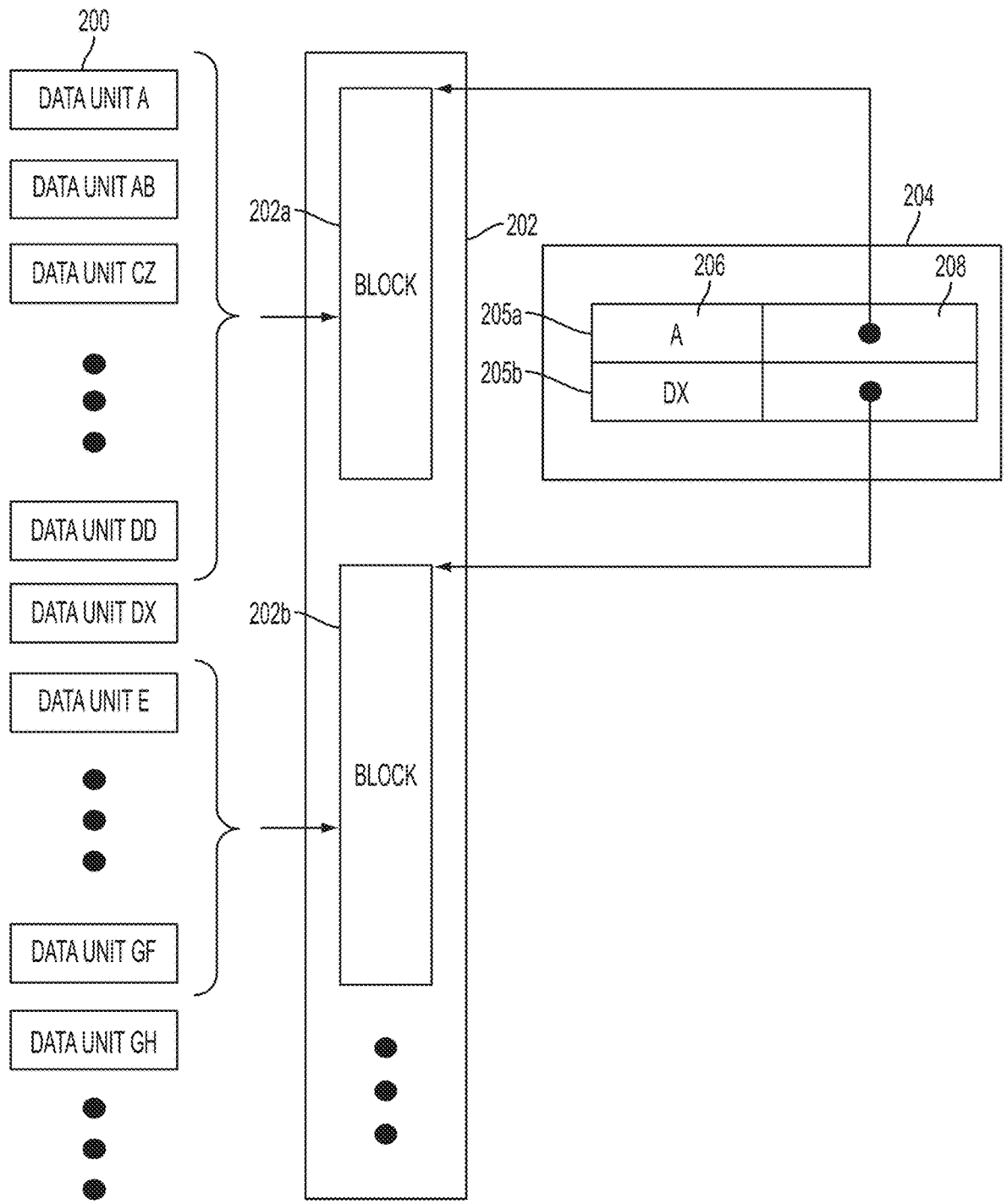
FIG. 2 is a block diagram of an illustrative data store configured in accordance with a data management scheme for managing data using compressed blocks of data units and associated indexing information, in accordance with some embodiments of the technology described herein.

FIG. 2 illustrates an example of managing data using multiple objects comprising data units. In this example, data units are managed using blocks. As shown, data units 200 are sorted alphabetically by key values: A, AB, CZ, etc. and divided into multiple blocks forming data unit blocks 202. For example, data units having key values A-DD constitute block 202*a* in data unit blocks 202 and data units having key values DX-GF constitute block 202*b* in data unit blocks 202. Each of data unit blocks 202 may be stored in data unit storage and may be compressed and/or encrypted prior to being stored. Accordingly, data unit blocks 202 may be stored as one or multiple (optionally compressed and/or encrypted) files.

Data unit blocks 202 are associated with indexing information 204 that may be used to efficiently locate a particular block of data units in data unit blocks 202. Indexing information may comprise entries for at least some (e.g., all) of the blocks in data unit blocks 202. An entry for a block may include a key field 206 storing information identifying the key value of the first data unit in the block and a location field 208 storing information identifying the storage location of the block. For example, the key field of entry 205*a* has the key value "A" corresponding to the key value of the first data unit in block 202*a* (i.e., Data Unit A) and the location field of entry 205*a* stores information identifying the storage location of block 202*a*. As another example, the key field of entry 205*b* has the key value "DX" corresponding to the key value of the first data unit in block 202*b* (i.e., Data Unit DX) and the location field of entry 205*b* stores information identifying the storage location of block 202*b*. Additional detail about managing data using multiple blocks of data units may be found in U.S. Pat. No. 8,229,902, titled "Managing Storage of Individually Accessible Data Units," which is incorporated by reference herein in its entirety.

A data processing system may manage data in a data store using any suitable data structure(s). For example, in some embodiments, a data processing system may manage data in a data store at least in part by using one or more tables. For example, a data processing system may manage data units of transactional information (e.g., records of credit card transactions, records of phone calls, etc.) by using one or more tables each having a row of fields for each data unit (e.g., a row in a table may store at least some information for a particular call such as the number from which the call was made, the number to which the call was made, the name of the calling party, the name of the party called, the duration of the call, the date of the call, the time of the call, etc.). Data in a table may be partitioned into non-overlapping portions of data termed "volumes." For example, a table of phone call records may be partitioned into volumes each comprising records of phone calls made on a particular day or days. As another example, a table of credit card records may be partitioned into volumes each comprising records of credit card transactions made at a particular location. It should be appreciated that a data processing system is not limited to managing data using multiple objects comprising data units with associated indexing information and may manage data in other ways. For example, a data processing system may manage data using flat text files, spreadsheet files, a relational database system, and/or any other suitable way.

It should also be appreciated that storage 109 may comprise storage at one physical location or multiple physical locations so that any data in storage 109 may be stored at one physical or multiple physical locations. For example, data in a single data store may be stored in one or multiple physical locations. As another example, data in different data stores may be stored in one or multiple physical locations. As yet another example, a template and a data store to which it corresponds may be stored at one or multiple physical locations.

As described above, data processing system 105 comprises computer programs 110 for performing operations on the data stores 114 such as lifecycle operations and/or any other suitable types of operations. Computer programs 110 may comprise one or more computer programs configured to perform any suitable types of lifecycle operations on data stores 114, examples of which are described herein.

As discussed above, a computer program may be configured to perform a lifecycle operation on a data store in accordance with the data management scheme for the data store. For example, the computer program may be configured to perform a lifecycle operation on a data store in accordance with how the data in the data store is stored and/or indexed (e.g., in accordance with how the data is stored and indexed in blocks of records corresponding to a particular indexing key in embodiments where a data store manages data using multiple blocks of records and associated indexing information). Accordingly, different computer programs may be used to perform a particular lifecycle operation on data stores configured in accordance with different data management schemes. As one example, one computer program may be used to perform a particular lifecycle operation on a data store configured to store and index phone call records in blocks of records corresponding to the days on which the calls were made, and a different computer program may be used to perform the same lifecycle operation on another data store configured to store and index phone call records in blocks of records corresponding to the area codes from which the calls were made.

Accordingly, in some embodiments, computer programs 110 comprise one or more computer programs to perform lifecycle operations for each data store in data stores 114. For example, when data stores 114a, 114b, and 114c are configured with different data management schemes, computer programs 110 may comprise one or more computer programs for performing lifecycle operations on data store 114a, one or more other computer programs for performing lifecycle operations on data store 114b, and one or more still other computer programs for performing lifecycle operations on data store 114c.

In some embodiments, computer programs 110 may comprise a computer program configured to perform one lifecycle operation on a data store. However, in other embodiments, computer programs 110 may comprise a computer program configured to perform multiple different lifecycle operations on the data store, as aspects of the technology described herein are not limited in this respect.

Computer programs 110 may comprise a computer program of any suitable type and written in any suitable language(s). In some embodiments, data processing system 105 executes programs in the form of graphs and computer programs 110 may comprise one or more computer programs developed as dataflow graphs. A dataflow graph may include components, termed "nodes" or "vertices," representing data processing operations to be performed on input data and links between the components representing flows of data. Techniques for executing computations encoded by dataflow graphs is described in U.S. Pat. No. 5,966,072, titled "Executing Computations Expressed as Graphs," which incorporated by reference herein in its entirety. An environment for developing computer programs as data flow graphs is described in U.S. Pat. Pub. No.: 2007/0011668, titled "Managing Parameters for Graph-Based Applications," which is incorporated by reference herein in its entirety.

Figure 3A:
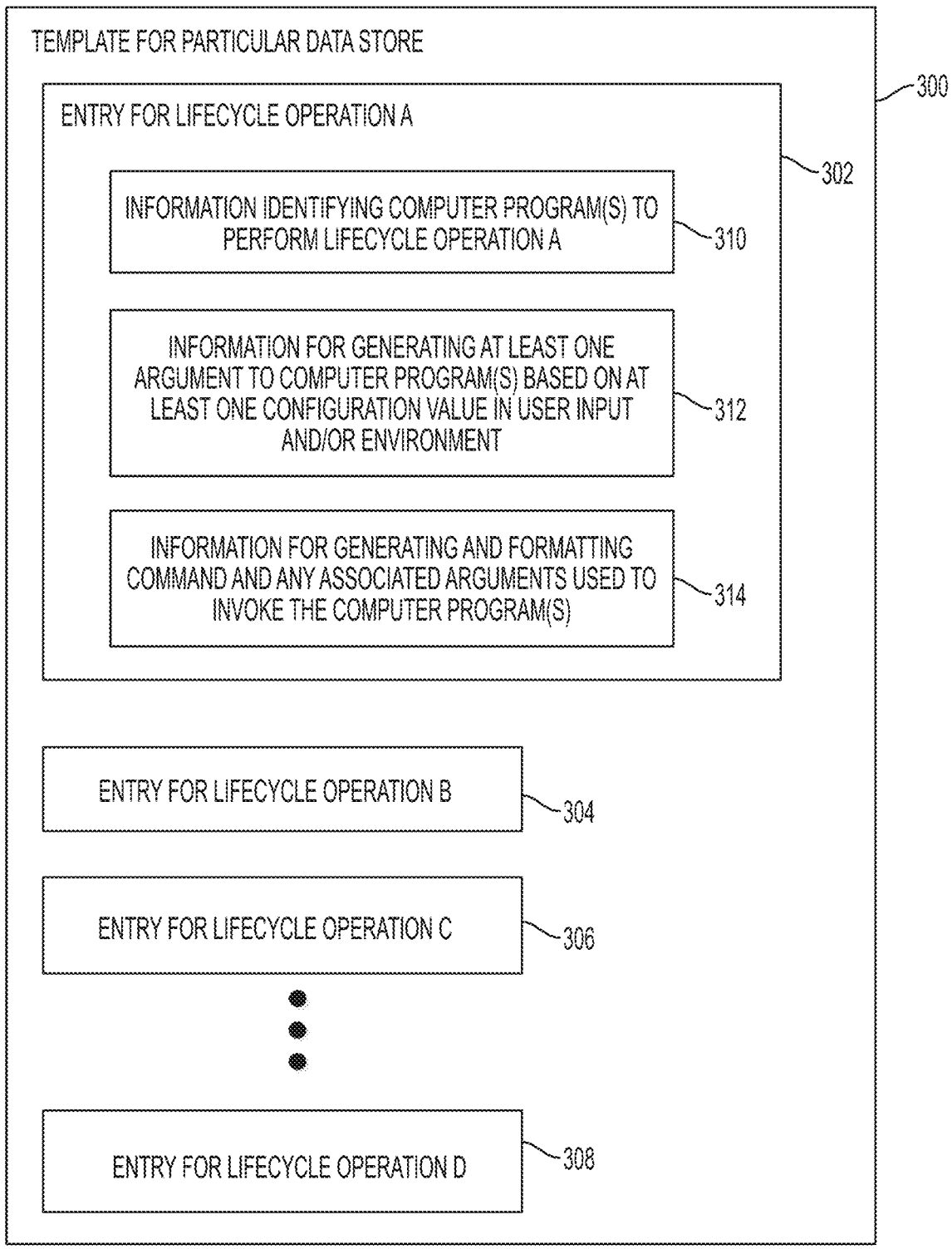
FIG. 3A is diagram illustrating a template for a data store, in accordance with some embodiments of the technology described herein.

As discussed above, in some embodiments, a template (e.g., template 112a, template 112b, template 112c, etc.) associated with a data store (e.g., data store 114a, data store 114b, data store 114c, etc.) may contain an entry for each of one or multiple lifecycle operations to perform on the data store. For example, as shown in FIG. 3A, illustrative template 300 comprises entries 302, 304, 306, and 308 for lifecycle operations "A" (e.g., create table), "B" (e.g., create volume), "C" (e.g., delete table), and D (e.g., delete volume). In some embodiments, the template may contain entries for each of a predefined set of lifecycle operations.

A template entry corresponding to a lifecycle operation may comprise information that may be used to generate a command for invoking a computer program (e.g., one of computer programs 110) to perform the lifecycle operation on the data store with which the template is associated. For example, template 112a may comprise entries corresponding to lifecycle operations that may be performed on data store 114a. When a user provides input (e.g., via user interface 108b) specifying a lifecycle operation to be performed on data store 114a, the entry corresponding to the specified lifecycle operation may be identified in template 112a and information in the entry may be used to generate a command to invoke a computer program (e.g., computer program 110a) to perform the specified lifecycle operation on the data store 114a.

A template entry for a lifecycle operation may comprise any suitable information for generating a command to invoke a computer program to perform the lifecycle operation. For example, the entry may comprise information identifying the computer program that may be used to perform the lifecycle operation, information identifying a command used to invoke the computer program, information identifying the command's arguments, information identifying where (e.g., from user input, from one or more environment variables, from a file, etc.) to obtain values for the command's arguments, information indicating how to format one or more configuration values specified by a user as arguments to the command, information identifying the location of the data store with which the template is associated, and/or any other suitable information. The data processing system 105 may use information in the template entry to process input provided by a user (e.g., via user interface 108*b*) and generate a command having appropriate arguments formatted in an appropriate way to invoke the computer program.

FIG. 3A illustrates an example of content that may be included in a template entry corresponding to a lifecycle operation. As shown in FIG. 3A, template entry 302 comprises information 310 identifying a computer program (or computer programs) to perform the lifecycle operation. Information 310 may specify a reference to the computer program, for example, the command that may be used to invoke the computer program and the directory from which the computer program is to be invoked. Template entry 302 further comprises information 312 for generating at least one argument to the computer program based on at least one configuration value in the user input and/or the environment. Information 312 may include information identifying how to obtain (e.g., parse) one or more configuration values from user input and/or otherwise obtain the configuration value(s) from the runtime environment. Template entry 302 further comprises information 314 for generating and formatting a command and any associated arguments used to invoke the computer program. Information 314 may indicate how to generate a string comprising the command to invoke the computer program and arguments to the command from one or more configuration values obtained from the user input and/or the runtime environment. Information stored in a template entry, such as entry 302, may be stored in any suitable format, as aspects of the technology described herein are not limited in this respect. For example, in some embodiments, a template entry may comprise a script that may be executed to generate and format a command and any associated arguments such that the generated command may be used with the generated argument(s) to invoke the computer program for performing the lifecycle operation to which the template entry corresponds. In other embodiments, the information stored in a template entry may be used by a script or program not specified by the template to generate the command and associated arguments.

It should be appreciated that although information 310, 312, and 314 are shown in FIG. 3A using separate boxes, the information in template entry 302 may be organized and formatted in any suitable way, as aspects of the technology described herein are not limited in this respect. For example information 310, 312, and 314 may be organized separately or may be mixed.

Figure 3B:
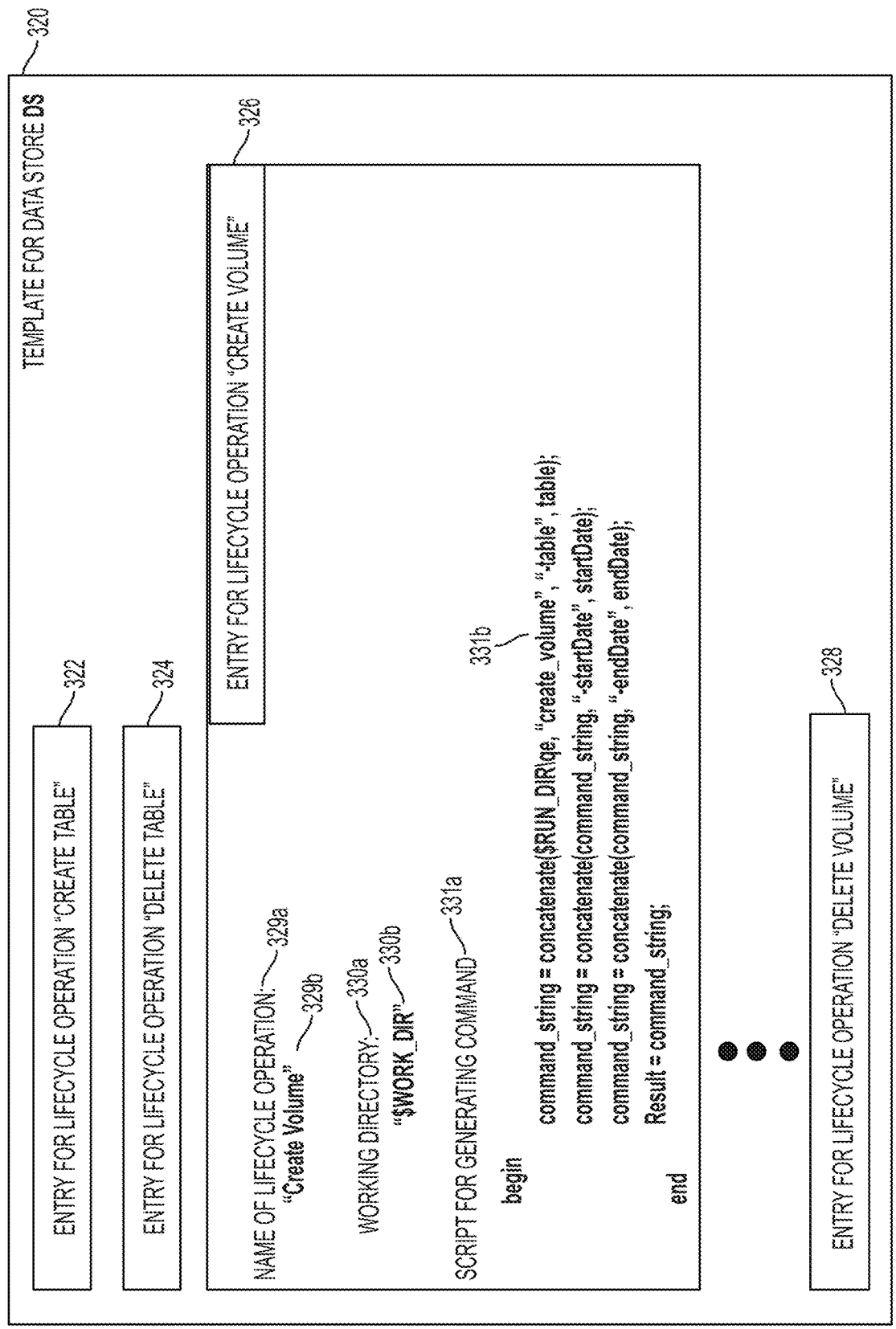
FIG. 3B is a diagram illustrating another template, in accordance with some with some embodiments of the technology described herein.

FIG. 3B is a diagram of another illustrative template—template 320—which includes entries 322, 324, 326, and 326 having information related to respective lifecycle operations. In the illustrated example, entry 322 includes information related to the "create table" lifecycle operation, entry 324 includes information related to the "delete volume" lifecycle operation, entry 326 includes information related to the "create volume" lifecycle operation, and entry 328 includes information related to the "delete volume" lifecycle operation. It should be appreciated that template 320 is not limited to having entries for these specific lifecycle operation and, in some embodiments, may have entries related to one or more other lifecycle operations instead of or in addition to the illustrated lifecycle operations.

In some embodiments, a template entry may comprise information organized into two or more sub-entries. For example, in the illustrated embodiment, entry 326 includes three sub-entries: sub-entry 329*a*, sub-entry 330*a*, and sub-entry 331*a*. Sub-entry 329*a* stores an identifier (e.g., a name) of the lifecycle operation to which entry 326 corresponds. As shown in FIG. 3B, the value 329*b* of sub-entry 329*a* is "Create Volume." A data processing system may use the value of sub-entry 329*a* to identify the entry in the template 320 that contains information related to the create volume lifecycle operation. Sub-entry 330*a* stores information identifying a working directory in which to execute the command, generated by using information in the template, in order to invoke the computer program for performing the lifecycle operation to which entry 326 corresponds (i.e., the "create volume" lifecycle operation). As shown in FIG. 3B, the value 330*b* of sub-entry 330*a* is "$WORK_DIR" which is an environment variable whose value can be determined at runtime. Sub-entry 331*a* stores a script 331*b* that, when executed, generates a command for invoking the computer program for performing the lifecycle operation to which entry 326 corresponds. It should be appreciated that the template sub-entries illustrated in FIG. 3B are non-limiting examples and that a template entry may include any suitable sub-entry or sub-entries instead of or in addition to the ones illustrated in FIG. 3B. A template entry is not limited to having any particular number of template sub-entries and, as such, may include any suitable number of sub-entries, each of which may be formatted in any suitable way and contain any suitable type of information, as aspects of the technology described herein are not limited in this respect.

Figure 3C:
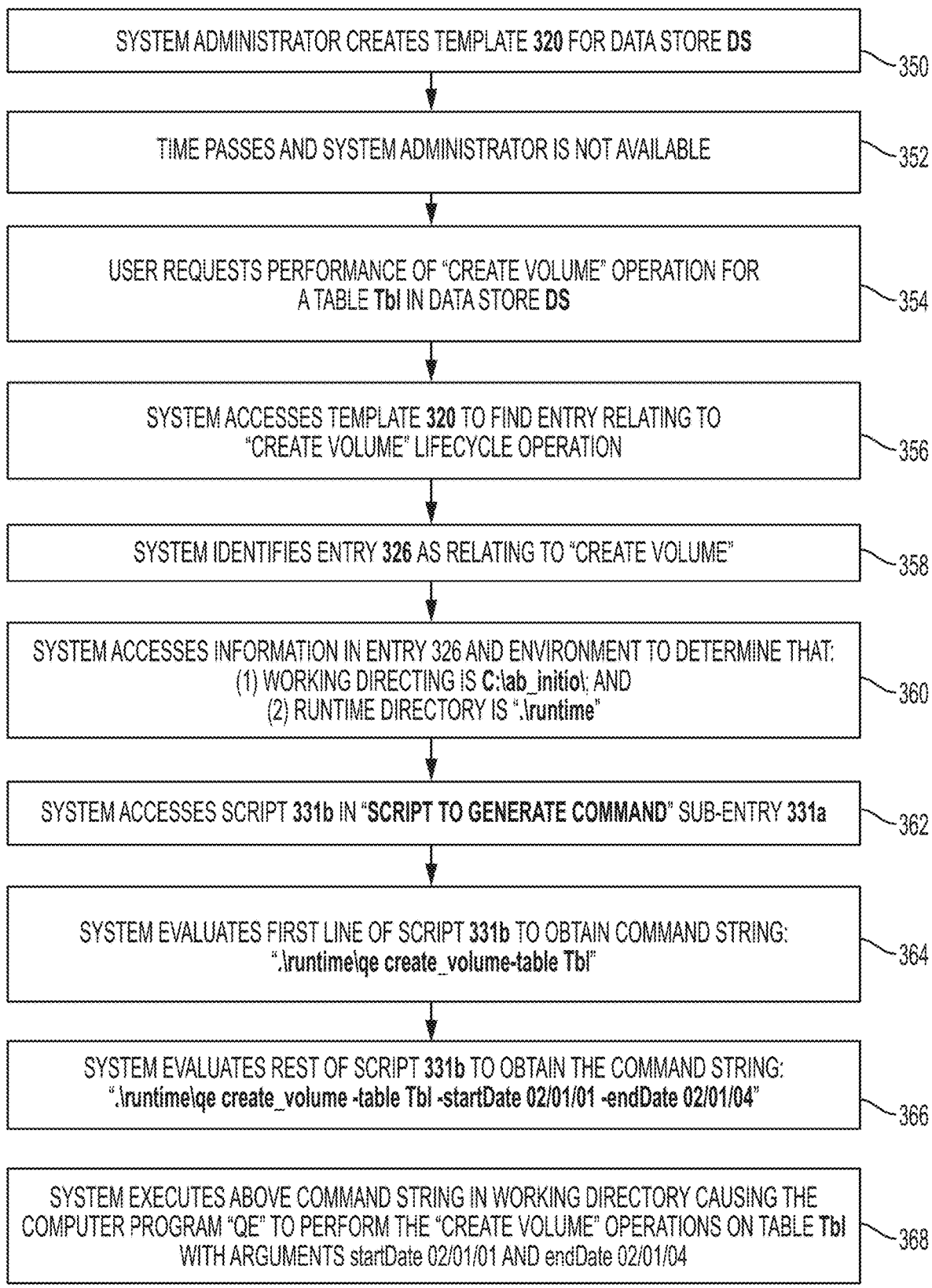
FIG. 3C is a flowchart providing an illustration of how the template of FIG. 3B may be used to cause a lifecycle operation to be performed, in accordance with some embodiments of the technology described herein.

FIG. 3C is a flowchart illustrating a scenario of how the example template 320 of FIG. 3B may be used to cause a data processing system to perform a lifecycle operation on a data store. The illustrative scenario of FIG. 3C begins at act 350 in which an administrator of a data processing system (e.g., data processing system 105 described with reference to FIG. 1A) creates template 320 for a data store DS and associates template 320 with the data store DS. As described above, such a system administrator may configure the data store DS in accordance with a particular data management scheme designed to provide efficient access to data of the type to be held in the data store, and may create the template so that a subsequent user may use the template to invoke one or more lifecycle operations on the data store without knowledge of the data management scheme used by the administrator. For example, as described in this scenario, after act 352 during which time passes and the system administrator becomes unavailable, a data processing system may perform a create-volume lifecycle operation requested by a user based on information in the template 320.

In particular, at act 354, a user of the data processing system may request that the system performs a create volume lifecycle operation on a table Tbl in data store DS. In other words, the user may request that the data processing system add a new volume to that table. The request may identify one or more configuration values for performing the lifecycle operation. For example, the request may specify a range of dates within which the dates of records to be stored in the volume are to fall. As a specific non-limiting example, the request may specify that the volume be used to store records having dates between 02/01/2001 and 02/01/20014. The user may provide a request that the system perform a create volume lifecycle operation in any suitable way including in any of the ways described with reference to FIG. 5.

After receiving the request to perform the "create volume" lifecycle operation, the data processing system accesses template 320, at act 356, to find an entry relating to the create volume lifecycle operation. The data processing system may search through the entries, examining their content, to find the entry that relates to the create volume operation. Accordingly, at act 358, the data processing system may identify entry 326 as relating to the create volume lifecycle operation because sub-entry 329a has value "Create Volume".

Upon identifying entry 326 as the entry in the template 320 that contains information relating to the create volume lifecycle operation, the data processing system may begin accessing information in entry 326 that will be used for performing the lifecycle operation. For example, at act 360, the system may access in entry 326 and, optionally the runtime environment, to determine the working and runtime directories. For example, the system may access the "working directory" sub-entry (i.e., sub-entry 330a) to identify the directory in which to execute the command to invoke the computer program to perform the create volume lifecycle operation, after that command is generated. As described above, in this example, the value of the sub-entry 330a is the environment variable "$WORK_DIR." Accordingly, the data processing system may determine the value of the $WORK_DIR in the runtime environment, which in this example, is "C:\ab_initio". The data processing system may similarly determine the runtime directory by accessing the value of the $RUN_DIR variable in the runtime environment. In this example, the value of the $RUN_DIR variable in the runtime environment is "\runtime".

Next, the data processing system may access information in entry 326 that the system will use to generate the command to invoke a computer program to perform the create volume operation on the data store DS. Accordingly, at act 362, the data processing system may access script 331b in sub-entry 331a of entry 326, which the data processing system will use to generate the command.

Next, at acts 364 and 366, the data processing system evaluates the first, second, and third lines of script 331b in order to generate a command for invoking the computer program to perform the create volume operation on the data store DS. First, at act 364, the data processing system evaluates the first line of script 331b to obtain the command string ".\runtime\qe create_volume -table Tbl" by concatenating the string ".\runtime" representing the runtime directory, the string "qe" which is an identifier of the computer program to be used in performing the create volume lifecycle operation, the string "create volume" indicating the lifecycle operation to be performed by the computer program "qe", the string "-table" indicating that the create volume operation is to be performed on the table identified by the variable "Tbl" which follows the "-table" string. Next, at act 366, the data processing system evaluates the second and third lines of script 331b to obtain the following command string ".\runtime\qe create_volume -table Tbl -startDate 02/01/01 -endDate 02/01/04" by concatenating the previous value of the command string with arguments indicating that the records to be stored in the created volume are associated with dates starting Feb. 1, 2001 and ending Feb. 1, 2004.

Next, at act 368, the data processing system executes in the working, directory, the command string obtained at the end of act 366. Accordingly, the data processing system executes the following command: "C:\ab_initio\runtime\qe create_volume -table Tbl -startDate 02/01/01 -endDate 02/01/04." Execution of this command causes the computer program "qe" to execute the create volume lifecycle operation on the table Tbl with the arguments provided to it.

Additional examples of template entries are shown in FIGS. 4A-4G, which show template entries of an illustrative template, each template entry corresponding to different lifecycle operations. FIG. 4A shows an illustrative template entry for the create table lifecycle operation. FIG. 4B shows an illustrative template entry for the create volume lifecycle operation. FIG. 4C shows an illustrative template entry for the delete volume lifecycle operation. FIG. 4D shows an illustrative template entry for the create index lifecycle operation. FIG. 4E shows an illustrative template entry for the delete table lifecycle operation. FIG. 4F shows an illustrative template entry for the list file lifecycle operation (e.g., which may be used to list the files storing a table in a data store, list the volumes of a table in a data store, etc.). FIG. 4G shows an illustrative template entry for the validate table lifecycle operation (e.g., which may be used to determine that the data stored in a particular volume of a table, such as a volume for records from a particular date, is data that should be stored in that particular volume because, for example, the data contains records having that particular date).

Each of the illustrative template entries shown in FIGS. 4A-4G comprises a script configured to generate a command to invoke a computer program for performing a lifecycle operation with which the template entry is associated. The script generates the command to include an identifier that may be used to invoke the computer program and a vector of one or more arguments to pass to the computer program. The script obtains the arguments to pass to the command either from user input (e.g., by checking whether a particular configuration value was passed in by a user via user interface 108b) and one or more environment parameters (e.g., to identify a directory where the command should be executed).

For example, the template entry for the create volume lifecycle operation shown in FIG. 4B includes a script that generates a command, represented by variable 402 (i.e., "args") to invoke a computer program to perform the create volume operation. The generated command includes an identifier 404 (i.e., "${AI_BIN}/ab-qe") may be used to invoke the computer program and a vector of arguments. The vector of arguments includes arguments obtained from configuration values provided by a user such as the user input. For example, the user may provide a date range for the volume using a configuration value identifying a start date for the range (the "from" value) and an end date (the "to" value), and the script (at lines 406) identifies these values in the user input and formats the command to include arguments having these configuration values. The vector of arguments also includes information obtained from sources other than user input. For example, the vector of arguments includes the arguments "create" and "table" as seen at command portion 408. As another example, the vector of arguments includes the argument "table" at command portion 410, which is an environment variable referencing the table to which the new volume is to be added.

Although the template entries shown in FIGS. 4A-4G are scripts, template entries are not limited to being scripts and information in a template may be formatted in other ways. For example, information in a template may be formatted using any suitable mark-up language such as XML or HTML. As another example, the template may be text file.

As yet another example, the template may itself be a computer program (interpreted or compiled) written in any suitable programming language. It should be appreciated that these examples are illustrative and non-limiting as information in a template may be in any suitable format. It should also be appreciated that the template entries shown in FIGS. 4A-4G are illustrative and non-limiting and template entries, according to some embodiments, may deviate from the examples shown in FIGS. 4A-4G.

In some embodiments, a template may be stored in a single file or in multiple files (e.g., one or more XML files, one or more text files, etc.). However, a template need not be stored in a file and may be stored in any other suitable way on a non-transitory storage medium or media. Data processing system 105 may store templates 112 in one or multiple physical locations.

Administrative interface 108a of data processing system 105 may allow a user (e.g., user 101a) to configure the data management system to manage data in accordance with a data management scheme. This may be done in any suitable way. For example, in some embodiments, administrative interface 108a may be provide one or more interfaces that allow a user to provide information used for configuring a data store (e.g., one of data stores 114) with the data management scheme, creating one or more computer programs to perform lifecycle operations on the data store, creating templates linking information identifying lifecycle operations to information used for generating commands for invoking the computer program(s) and/or any other suitable information for configuring the data management system to manage data in accordance with the data management scheme. Information used for generating commands for the invoking the computer program(s) may include one or more strings and/or parameters used for generating the commands. The parameters may have predetermined values (e.g., values stored in the template) or values that are dynamically determined based on the values of one or more passed in and/or environment variables.

User interface 108b of data processing system 105 may allow a user (e.g., user 101b) to specify one or more lifecycle operations to perform on a data store. This may be done in any suitable way. For example, in some embodiments, user interface 108b may be a graphical user interface (GUI) and may comprise one or more selectable GUI elements (e.g., buttons, checkboxes, etc.) that a user may select to provide an indication that the user desires a particular lifecycle operation to be performed on a data store. For instance, the GUI may have buttons for lifecycle operations that may be performed on a data store (e.g., a button for the create table lifecycle operation, a button for the create volume lifecycle operation, a button for the delete volume lifecycle operation, etc.) and the user may select a button corresponding to a particular lifecycle operation to invoke the lifecycle operation. However, user interface 108b is not limited to being a graphical user interface and, for example, may be a text-based (e.g., command line) interface in which a user may type in a name of a lifecycle operation at a prompt in order to invoke the lifecycle operation or any other suitable type of user interface.

In some embodiments, user interface 108b may allow a user to provide one or more configuration values for a particular lifecycle operation. For example, when the data processing system comprises multiple data stores (e.g., data stores 114a, 114b, and 114c), the user may provide a configuration value for a lifecycle operation indicating the particular data store on which the lifecycle operation is to be performed. As another example, the user may provide a configuration value for the "create table" lifecycle operation indicating a key to use for managing (e.g., sorting, storing, indexing, etc.) records in the table. The key may be a field in the records (e.g., phone number field in phone records, credit card holder name in credit card records, etc.). For instance, in embodiments where the data processing system 105 manages tables of records using multiple blocks of records and associated indexing information as described above with reference to FIG. 2, the configuration value indicating a key may be used to partition records into multiple blocks and generate associated indexing information. As yet another example, the user may provide a configuration value for the "delete volume" operation indicating which of multiple volumes in a table to delete. As yet another example, when the data store comprises multiple tables, the user may provide a configuration value for the "delete table" lifecycle operation indicating which of the tables is to be deleted. The above examples of configuration values are illustrative and not limiting, as user interface 108b may allow a user to input any suitable configuration value(s) for any lifecycle operations. It should also be appreciated that some lifecycle operations may be invoked without any configuration values received from the user (e.g., such lifecycle commands may not require any arguments or only those arguments whose values are obtained from sources other than the user such as environment variables).

In some embodiments, user interface 108b may be configured based on information in a template associated with a data store. For example, user interface 108b may be configured to have, for a template entry corresponding to a particular lifecycle operation, a GUI element (e.g., a button) that allows a user to select the particular lifecycle operation on the data store with which the template is associated. After a user selects a GUI element corresponding to a particular lifecycle operation, the GUI may present a user with one or more GUI elements that the user may utilize to provide one or more configuration values for the lifecycle operation. In some embodiments, user interface 108b may be configured dynamically based on the template such that the GUI is configured to have selectable buttons for only those lifecycle operations that have corresponding entries in the template.

As illustrated in FIG. 1A, users 101a and 101b interact with data processing system 105 using computing devices 102a and 102b, respectively. Each of computing devices 102a and 102b may be any suitable computing device, fixed or portable, as aspects of the technology described herein are not limited in this respect. Computing devices 102a and 102b are connected to data processing system via network 107 and connections 103a, 103b, and 103c. Network 107 may be any suitable type of network such as the Internet, an intranet, a wide area network, a local area network, and/or any other suitable type of network. Each of connections 103a, 103b, and 103c may be a wired, wireless, and/or any other suitable type of connection.

It should be appreciated that environment 100 is illustrative and that there are variations of environment 100. For instance, although in the illustrated embodiment, there is a one-to-one correspondence between templates and data stores of a data processing system, other embodiments are not limited in this respect. For example, in some embodiments a single template may comprise information for generating commands to invoke computer programs to perform lifecycle operations on multiple data stores. In such embodiments, a configuration value provided by a user and/or other information may indicate which template entry to select for a particular lifecycle operation to be performed on a particular data store. As another example, in some embodiments, multiple templates may comprise information for generating commands to invoke computer programs to perform lifecycle operations on a single data store.

Figure 5:
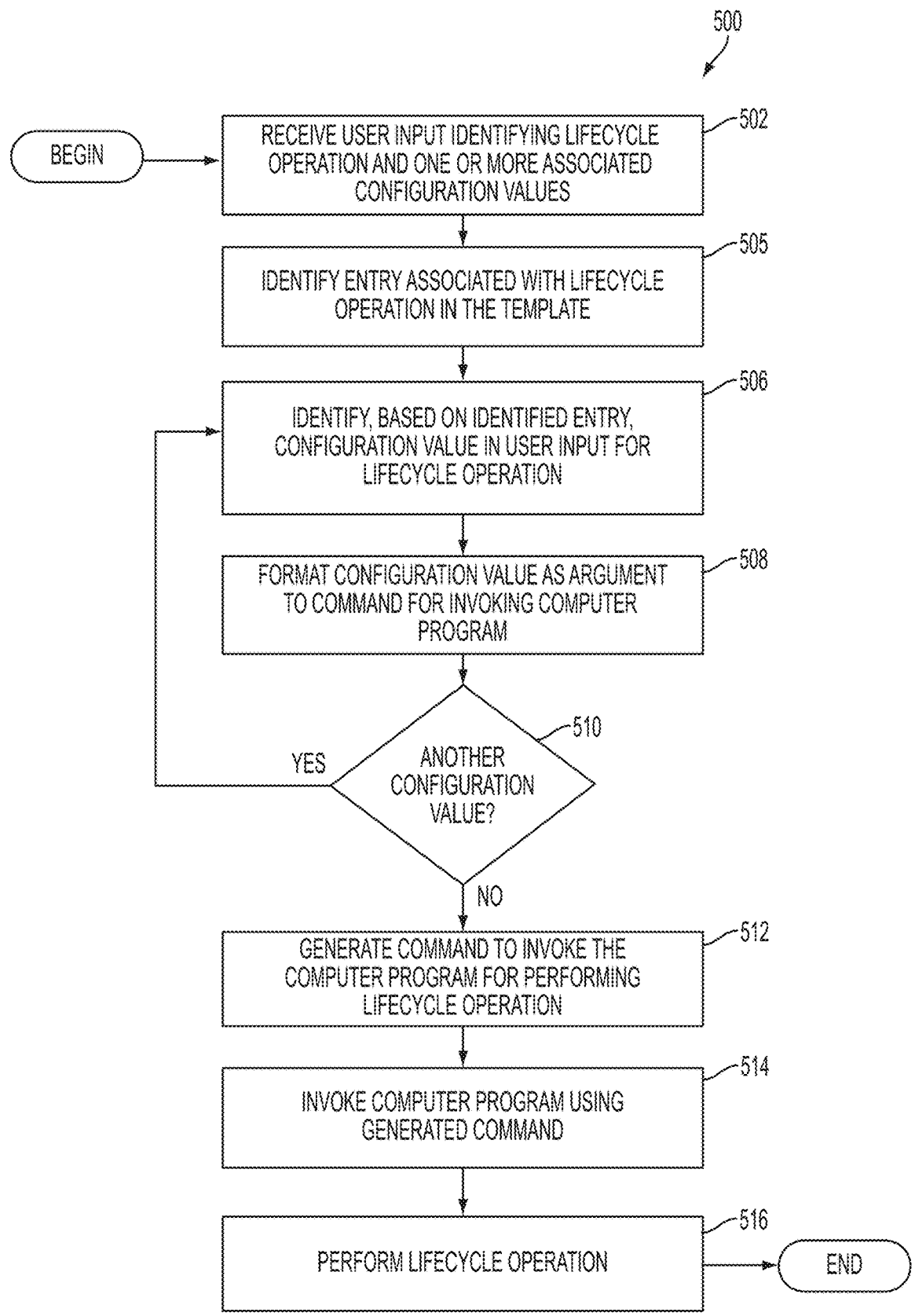
FIG. 5 is a flowchart of an illustrative process for performing a lifecycle operation on a data store by using a template, in accordance with some embodiments of the technology described herein.

FIG. 5 is a flowchart of an illustrative process 500 for performing a lifecycle operation on a data store (e.g., data store 114a) by using a template associated with the data store (e.g., template 112a), in accordance with some embodiments of the technology described herein. Process 500 may be performed by any suitable data processing system and, for example, may be performed by data processing system 105 described above with reference to FIG. 1A. Process 500 may be used to perform any suitable lifecycle operation (examples of which have been described above) on any data store accessible by the data processing system.

Process 500 begins at act 502, where user input identifying a lifecycle operation on a data store is received. User input may be received in any suitable way and, for example, may be received via user interface 108b described above with reference to FIG. 1A. For instance, user interface 108b may be a graphical user interface that allows a user to specify a lifecycle operation to perform on a data store and the user input may comprise an indication of the lifecycle operation specified by the user via user interface 108b. User input received at act 502 may comprise other information in addition to information identifying a lifecycle operation to perform on the data store and, for example, may comprise one or more configuration values for the lifecycle operation, and/or any other suitable information.

Next process 500 proceeds to act 504, where the data processing system identifies a template entry that corresponds to the lifecycle operation in the user input received at act 502. This may be done in any suitable way. As one example, in some embodiments, each template entry may be associated with an identifier (e.g., a keyword, an id number, etc.) of the corresponding lifecycle operation (e.g., the create table lifecycle operation). When information in the user input matches an identifier of an entry in the template that entry may be identified as the one that corresponds to the lifecycle operation specified by the user. The template entry identified at act 504 may comprise any suitable information that may be used to generate a command for invoking a computer program to perform the lifecycle operation, specified in the user input, on the data store. Examples of such information are provided herein.

Next process 500 proceeds to acts 506, 508, and 512 and decision block 510 during which a command is generated, based on information in the identified template entry, to invoke a computer program to perform the lifecycle operation specified in the user input obtained at act 502.

At act 506, the template entry identified at act 504 may be used to identify a configuration value in the user input obtained at act 502 for the lifecycle operation. The identified template entry may be used to identify a configuration value in the user's input in any suitable way. For example, the identified template entry may comprise information that may be used to identify the configuration value in the users input. Such information may include identifiers (e.g., names, numerical ids, etc.) of one or more configuration values, which identifiers may be used to identify the configuration value in the input when the input includes the same identifiers. Such information may also include formatting information that indicates how the input is formatted (e.g., configuration values may be demarcated by special characters of strings) and may be used to identify the configuration value in the input. Additionally or alternatively, the identified template entry may comprise any other suitable information that may be used to identify the configuration value in the input. In some instances, the identified template entry may comprise an executable portion (e.g., one or more commands, a script or scripts, a function call, etc.) that, when executed, is configured to identify the configuration value in the user's input using any of the above-described information and/or any other suitable information.

Regardless of the way in which a configuration value is obtained at act 506, the obtained configuration value is formatted at act 508 as an argument to a command for invoking the computer program to perform the lifecycle operation. This may be done in any suitable way. For example, the argument may be formatted to include a tag identifying the argument and the configuration value obtained at act 506. As another example, in embodiments where arguments to the command are organized in a data structure (e.g., array, vector, list, etc.), the configuration value identified at act 506 may be placed in the appropriate portion of the data structure.

After the configuration value is formatted at act 508, the process 500 proceeds to decision block 510, where it is determined whether another configuration value is to be identified in the user input. This determination may be made in any suitable way. For example, the template entry may comprise a list of one or more configuration values that are needed to generate the command and, when one or more of the configuration values have not yet been obtained, it may be determined that another configuration value is to be obtained. When it is determined that another configuration value is to be obtained, process 500 returns, via the YES branch, to act 506 and another configuration value may be obtained.

On the other hand, when it is determined at decision block 510 that no additional configuration values are to be obtained, process 500 proceeds, via the "NO" branch, to act 512, where a command is generated to invoke a computer program for performing the lifecycle operation specified in the user input received at act 502. The command may be generated to include one or more arguments obtained from the configuration values identified at act 506 and formatted at act 508. Thus, the command is formatted to include the configuration values identified at act 506. The command may be generated to also include one or more arguments obtained from information other than the user input and, for example, may contain one or more arguments obtained from information accessible in the executing environment of the data processing system (e.g., the directory storing the computer program used to invoke the lifecycle command, information about directories where needed libraries or other functions may be accessed, current date/time information, information indicating some aspect of the configuration of the data store on which lifecycle information is to be performed, etc.).

Next, process 500 proceeds to act 514, where the command generated at act 512 is executed to invoke a computer program for performing the lifecycle operation. The command may be executed in any suitable way using any suitable environment (e.g., an environment for executing scripts, an operating system environment such as a shell, etc.), as aspects of the technology provided herein are not limited in this respect.

After invoking, process 500 proceeds to act 516, where the invoked computer program performs the lifecycle operation. After the lifecycle operation is performed at act 516, process 500 completes.

It should be appreciated that process 500 is illustrative and that there are variations of process 500. For example, although in the illustrated embodiment, configuration values specified in the user input are identified and then formatted one at a time, in other embodiments, all the configuration values may be identified first and subsequently formatted as part of generating the command to invoke the computer program for performing the lifecycle operation.

Figure 6:
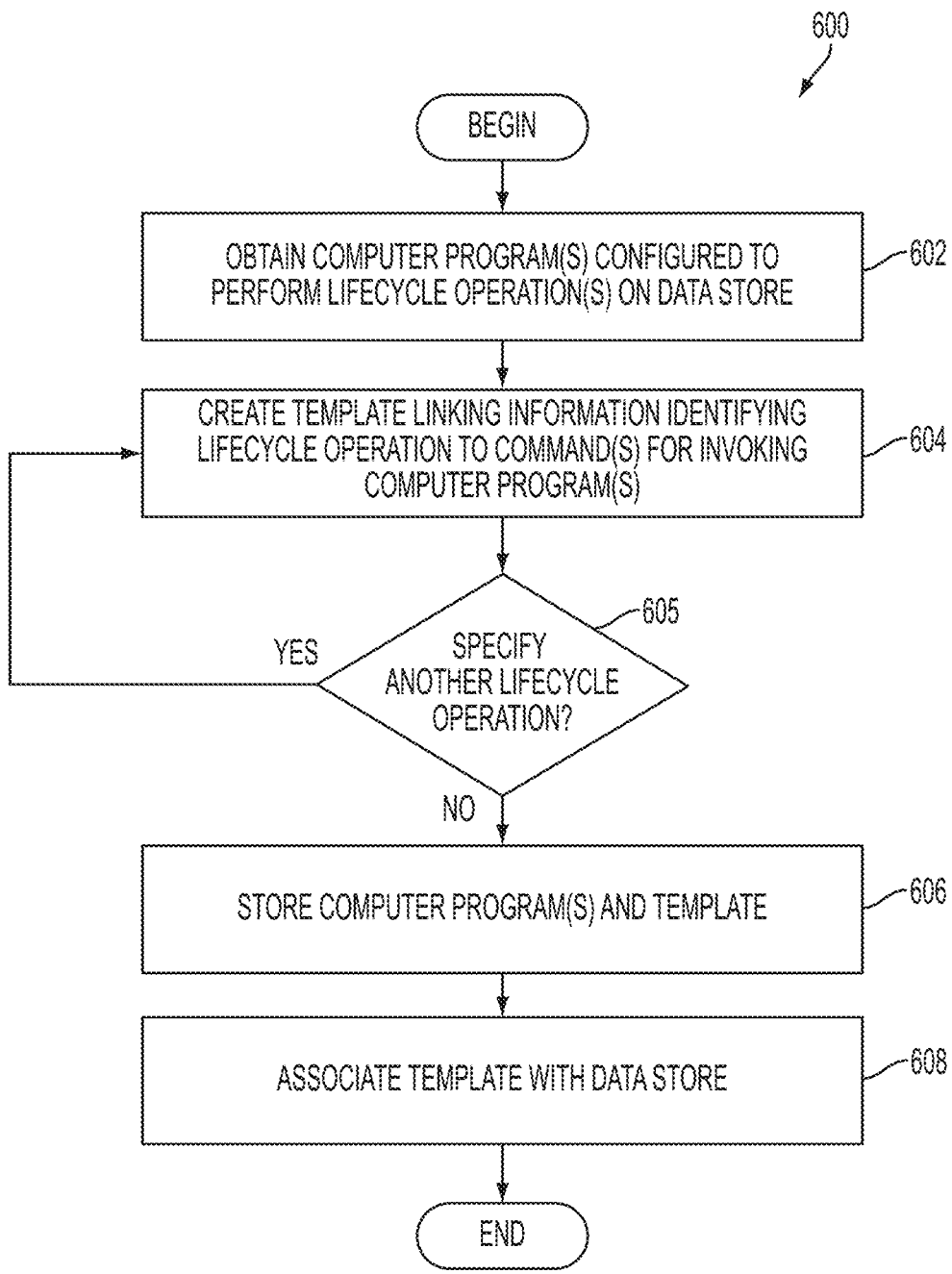
FIG. 6 is a flowchart of an illustrative process for configuring an environment used for performing life cycle operations on a data store, in accordance with some embodiments of the technology described herein.

FIG. 6 is a flowchart of an illustrative process 600 for configuring a data processing system to perform life cycle operations on a data store, in accordance with some embodiments of the technology described herein. Process 600 may be used to configure a data store in a way that provides efficient access to data to be held in the data store. For example, when the data processing system is deployed for a particular application (e.g., managing credit card transactions, managing phone call records, etc.), process 600 may be used to configure a data store to provide for efficient access to the application data. Configuring a data processing system in accordance with process 600 may allow one or more subsequent users of the data processing system to invoke lifecycle operations on one or more data stores accessible by the data processing system without obtaining detailed and complicated information about how the data processing system manages the data store(s) and/or how to invoke the computer programs to perform the lifecycle operations.

Process 600 may be performed by any suitable data processing system (e.g., data processing system 105), based on input from a user such as a system administrator. In particular, some acts of process 600 may be performed based at least in part on (e.g., in response to) input provided by a user, in furtherance of configuring the data processing to perform lifecycle operations on a data store. In some instances, the data processing system may guide the user in providing the information needed to perform various acts of process 600.

Process 600 begins at act 602, where one or more computer programs are obtained to perform one or more lifecycle operations on a data store. Computer program(s) to perform any suitable lifecycle operations, including any of the lifecycle operations described herein, may be obtained at act 602. The obtained computer program(s), which may be computer programs 110 described with reference to FIG. 1A, may be stored by the data processing system so that they may be invoked at a later time to perform the lifecycle operation(s). The obtained computer program(s) may be stored in any suitable format (e.g., source code, compiled code, byte code, etc.) and in any suitable location or locations, as aspects of the technology described herein are not limited in these respects.

In some embodiments, a computer program to perform a lifecycle operation may be obtained based at least in part on user input. For example, the user may input source code for the computer program (e.g., via a development environment), and the source code and/or its compiled version may be stored (e.g., as one of computer programs 110 described with reference to FIG. 1A). As another example, the user may provide input to create a dataflow graph computer program, via a development environment for developing applications as dataflow graphs, and the created dataflow graph may be stored (e.g., as one of computer programs 110).

As described above, a computer program for performing a lifecycle operation on a data store may operate in accordance with the data management scheme used to manage data in the data store. For example, the structure of the computer program may reflect how the data in the data store is stored and/or indexed in order to perform the lifecycle operation (e.g., the computer program was created under the assumption that data is stored and/or indexed in a particular way and, as such, is configured to operate on data in a manner consistent with how the data is stored and/or indexed). For instance, a data store may store data in volumes by data ranges (e.g., each volume of phone records contains phone records corresponding to a particular date or dates) and have a data object that identifies the existing volumes such that, when a computer program creates a new volume or deletes a volume, the computer program adds a corresponding entry to the data object or deletes the corresponding entry from the object. As another example, the computer program may have access to one or more parameters at least partially indicating the way in which the data processing system manages data in the data store. For instance, the computer program may have access to one or more parameters indicating one or more keys according to which data in the data store is sorted and/or indexed.

After one or more computer programs for performing one or more lifecycle operations are created at act 602, process 600 proceeds to act 604 where a template is created comprising at least one entry for at least one of the lifecycle operations for which a computer program was created at act 602. For example, when computer programs for performing the create table, delete table, create volume, and delete volume lifecycle operations are created at act 602, the template created at act 604 and decision block 605 may comprise entries for each (or a subset) of these lifecycle operations. A template entry corresponding to a lifecycle operation may comprise information that may be used to generate a command to invoke a computer program (created at act 602) to perform the lifecycle operation. Examples of information in a template entry are provided herein.

A template entry may be created, at act 604, based on input provided by a user, such as a system administrator. The user may create the template so that subsequent users of the data processing system may invoke lifecycle operations on any data store accessible by the data processing system without learning details of how data is managed in the data processing system, what computer program are to be used for performing the lifecycle operations, or how such computer programs are to be invoked (e.g., the format of the commands to invoke the computer programs, what arguments are to be passed to the computer programs, etc.).

After a template having at least one entry is created at act 604, process 600 proceeds to decision block 605 where it is determined whether another template entry corresponding to another lifecycle operation is to be created. This may be done in any suitable way. For example, when the template does not contain an entry for one of a predefined set of lifecycle operations (e.g., create table operation, create volume operation, delete table operation, delete volume operation), it may be determined that a template entry for the missing lifecycle operation is to be created. On the other hand, when the template contains an entry for each of a predefined set of lifecycle operations, it may be determined that another template entry is not to be created. As yet another example, a user may provide input indicating that the user will create another template entry or that the user has completed creating template entries. When it is determined, at decision block 605, that another template entry is to be created, process 600 returns, via the YES branch, to act 604, where such an entry may be created (e.g., in response to the system prompting the user to create such an entry or in any other suitable way).

On the other hand, when it is determined that no other template entry is to be crated, process 600 may proceed to act 606 where the created template is stored. The created template may be stored in any suitable location(s) that may be accessed by a data processing system configured to perform lifecycle operations on a data store. At act 608, the created template is associated with the data store on which the computer programs created at act 602 are configured to perform lifecycle operations. In this way, when a user provides an indication of a lifecycle operation to perform a particular data store, the associated template may be used to identify and (e.g., generate a command used to) invoke the appropriate computer program for performing the lifecycle operation on the data store.

Figure 7:
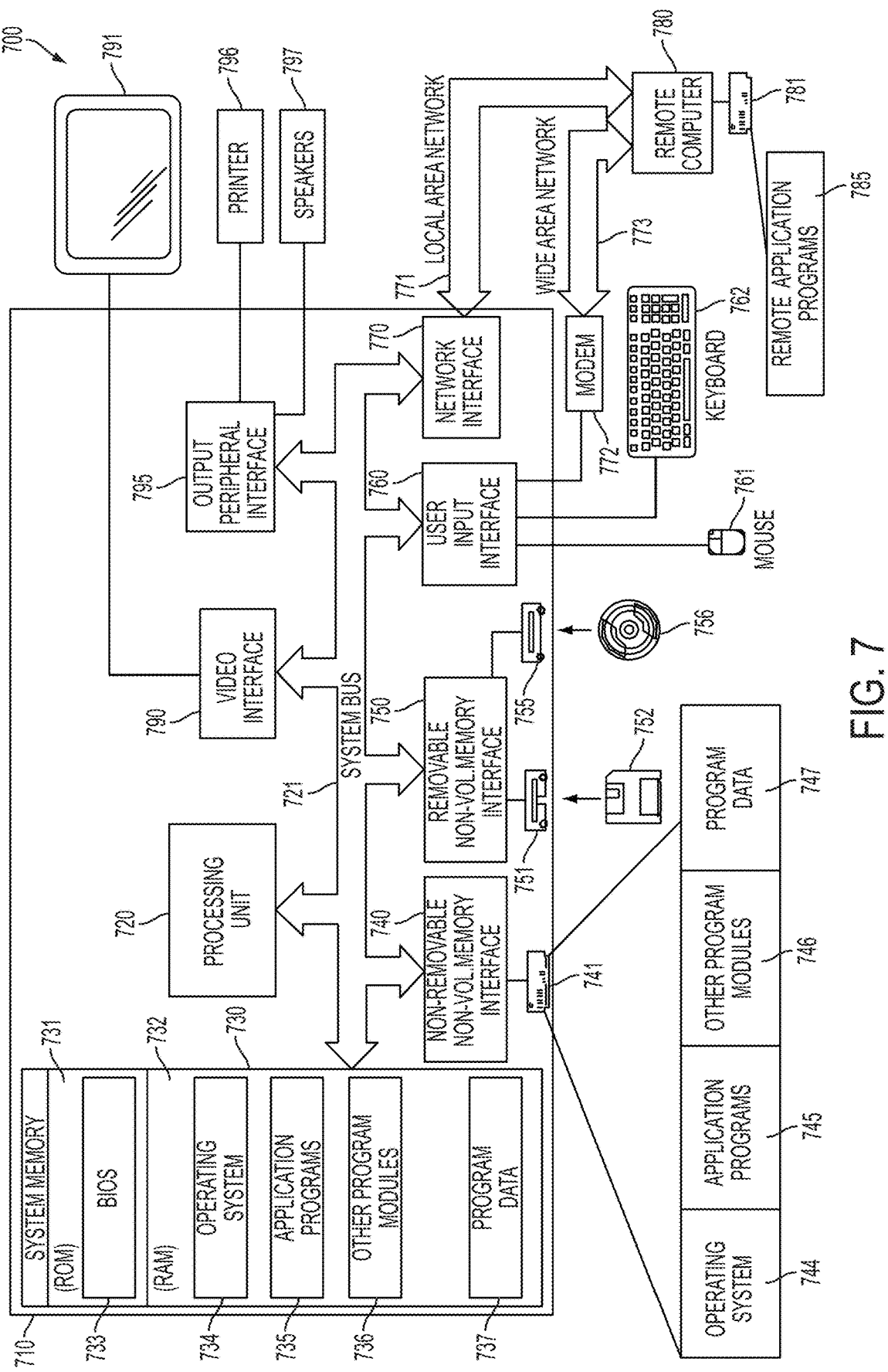
FIG. 7 is a block diagram of an illustrative computing system environment that may be used in implementing some embodiments of the technology described herein.

FIG. 7 illustrates an example of a suitable computing system environment 700 on which the technology described herein may be implemented. The computing system environment 700 is only one example of a suitable computing environment and is not intended to suggest any limitation as to the scope of use or functionality of the technology described herein. Neither should the computing environment 700 be interpreted as having any dependency or requirement relating to any one or combination of components illustrated in the exemplary operating environment 700.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the technology described herein includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," comprising, or "having", "containing," "involving," and variations thereof herein, is meant to encompass the items listed thereafter and equivalents thereof as well as additional items.

What is claimed is:

1. A method for performing one or more lifecycle operations on a data store, the method comprising:
   using at least one computer hardware processor to perform:
   receiving user input comprising information identifying a first lifecycle operation to perform on the data store and a configuration value for the first lifecycle operation, wherein the first lifecycle operation comprises an operation that, when performed on the data store, manages the way in which data is structured in the data store by creating, deleting, or altering one or more data structures used for managing data in the data store;
   accessing information in a template based at least in part on the information identifying the first lifecycle operation,
   wherein the template links information identifying at least one lifecycle operation to information used for generating at least one command for invoking at least one computer program that, when executed by a system different from the data store, operates on the data store and causes the at least one lifecycle operation to be performed on the data store, the at least one computer program including a first computer program;
   indirectly invoking performance of the first lifecycle operation on the data store at least in part by:
   generating, based at least in part on the accessed information in the template, a first command for invoking the first computer program on the system different from the data store to perform the first lifecycle operation on the data store,
   the first command comprising a reference to the first computer program and at least one argument to provide to the first computer program, the at least one argument being based on the configuration value; and
   executing the first command to invoke the first computer program with the at least one argument to perform the first lifecycle operation on the data store; and
   executing the first computer program on the system different from the data store to perform the first lifecycle operation on the data store.

2. The method of claim 1, further comprising using the at least one computer hardware processor to perform:
   receiving user input comprising information identifying a second lifecycle operation, different from the first lifecycle operation, to perform on the data store;
   accessing second information in the template based at least in part on the information identifying the second lifecycle operation;
   generating, based at least in part on the accessed second information in the template, a second command for invoking a second computer program of the at least one computer program to perform the second lifecycle operation on the data store, wherein the second command comprises a reference to the second computer program; and
executing the second command to invoke the second computer program to perform the second lifecycle operation on the data store.

3. The method of claim 1, wherein receiving user input comprises receiving user input via a graphical user interface.

4. The method of claim 1, wherein the data store is configured in accordance with a data management scheme, and wherein the first computer program, when executed, performs the first lifecycle operation on the data store in accordance with the data management scheme.

5. The method of claim 4, wherein data in the data store is managed in accordance with the data management scheme at least in part by using a plurality of compressed blocks of data units and associated indexing information, and wherein the first computer program, when executed, performs the first lifecycle operation on the data store based, at least in part, on the indexing information.

6. The method of claim 1, wherein the user input comprises at least one configuration value other than the first configuration value, and wherein the generating comprises formatting the at least one configuration value as at least one other argument to the first command.

7. The method of claim 1, wherein the first lifecycle operation is a create table lifecycle operation, a delete table lifecycle operation, a create volume lifecycle operation, or a delete volume lifecycle operation.

8. The method of claim 1, wherein the information used for generating at least one command for invoking at least one computer program is at least one command for invoking the at least one computer program.

9. The method of claim 1, wherein the one or more data structures used for managing data in the data store includes a table.

10. The method of claim 1, wherein the first computer program is a dataflow graph program.

11. The method of claim 1, wherein executing the first command to invoke the first computer program is performed in an environment external to the data store.

12. The method of claim 1, wherein executing the first command to invoke the first computer program is performed in a shell environment of an operating system.

13. A system for use with a data store and a template, linking information identifying at least one lifecycle operation to information used for generating at least one command for invoking at least one computer program that, when executed by the system, operates on the data store and causes the at least one lifecycle operation to be performed on the data store, the at least one computer program comprising a first computer program, the system being different from the data store, the system comprising:
at least one computer hardware processor; and
at least one non-transitory computer-readable storage medium storing processor-executable instructions that, when executed by the at least one computer hardware processor, cause the at least one computer hardware processor to perform:
receiving user input comprising information identifying a first lifecycle operation to perform on the data store and a configuration value for the first lifecycle operation,
wherein the first lifecycle operation comprises an operation that, when performed on the data store, manages the way in which data is structured in the data store by creating, deleting, or altering one or more data structures used for managing data in the data store;
accessing information in the template based at least in part on the information identifying the first lifecycle operation;
indirectly invoking performance of the first lifecycle operation on the data store at least in part by:
generating, based at least in part on the accessed information in the template, a first command for invoking the first computer program on the system different from the data store to perform the first lifecycle operation on the data store,
the first command comprising a reference to the first computer program and at least one argument to provide to the first computer program, the at least one argument being based on the configuration value;
executing the first command to invoke the first computer program with the at least one argument to perform the first lifecycle operation on the data store; and
executing the first computer program on the system different from the data store to perform the first lifecycle operation on the data store.

14. The system of claim 13, wherein the first lifecycle operation is a create table lifecycle operation, a delete table lifecycle operation, a create volume lifecycle operation, or a delete volume lifecycle operation.

15. At least one non-transitory computer-readable storage medium storing processor-executable instructions for execution on at least one computer hardware processor of a system for use with a data store and a template linking information identifying at least one lifecycle operation to information used for generating at least one command for invoking at least one computer program that, when executed by the system, operates on the data store and causes the at least one lifecycle operation to be performed on the data store, the processor-executable instructions, when executed by the at least one computer hardware processor, cause the at least one computer hardware processor to perform:
receiving user input comprising information identifying a first lifecycle operation to perform on the data store and a configuration value for the first lifecycle operation,
wherein the first lifecycle operation comprises an operation that, when performed on the data store, manages the way in which data is structured in the data store by creating, deleting, or altering one or more data structures used for managing data in the data store;
accessing information in the template based at least in part on the information identifying the first lifecycle operation;
indirectly invoking performance of the first lifecycle operation on the data store at least in part by:
generating, based at least in part on the accessed information in the template, a first command for invoking the first computer program on the system different from the data store to perform the first lifecycle operation on the data store,
the first command comprising a reference to the first computer program and at least one argument to provide to the first computer program, the at least one argument being based on the configuration value;
executing the first command to invoke the first computer program with the at least one argument to perform the first lifecycle operation on the data store; and
executing the first computer program on the system different from the data store to perform the first lifecycle operation on the data store.

16. The at least one non-transitory computer-readable medium of claim 15, wherein the first lifecycle operation is a create table lifecycle operation, a delete table lifecycle operation, a create volume lifecycle operation, or a delete volume lifecycle operation.

17. At least one non-transitory computer-readable storage medium storing processor-executable instructions for execution on at least one computer hardware processor of a system for use with a data store and a template linking information identifying at least one lifecycle operation to information used for generating at least one command for invoking at least one computer program that, when executed by the system, operates on the data store and causes the at least one lifecycle operation to be performed on the data store, the processor-executable instructions comprising:

means for receiving user input comprising information identifying a first lifecycle operation to perform on the data store and a configuration value for the first lifecycle operation, wherein the first lifecycle operation comprises an operation that, when performed on the data store, manages the way in which data is structured in the data store by creating, deleting, or altering one or more data structures used for managing data in the data store;

means for accessing information in the template based at least in part on the information identifying the first lifecycle operation;

means for indirectly invoking performance of the first lifecycle operation on the data store, comprising:

means for generating, based at least in part on the accessed information in the template, a first command for invoking the first computer program on the system different from the data store to perform the first lifecycle operation on the data store, the first command comprising a reference to the first computer program and at least one argument to provide to the first computer program, the at least one argument being based on the configuration value;

means for executing the first command to invoke the first computer program with the at least one argument to perform the first lifecycle operation on the data store; and means for executing the first computer program on the system different from the data store to perform the first lifecycle operation on the data store.

18. A method of operating a computer system different from a data store to perform one or more lifecycle operations on the data store, the method comprising:

using at least one computer hardware processor to perform:

receiving user input from a user interface;

identifying, in the received user input, an indication of a first lifecycle operation corresponding to a first entry in a template linking the first lifecycle operation to information used for generating a first command for invoking a first computer program that, when executed by the computer system different from the data store, operates on the data store and causes the first lifecycle operation to be performed on the data store, wherein the template includes a plurality of entries corresponding to a respective plurality of lifecycle operations, each of the plurality of lifecycle operations being a lifecycle operation for managing how data is structured in the data store by creating, deleting, or altering one or more data structures used for managing data in the data store, wherein the plurality of entries includes the first entry;

based on information in the first entry, identifying in the received user input a first configuration value associated with the first lifecycle operation;

indirectly invoking performance of the first lifecycle operation on the data store at least in part by:

formatting the first configuration value as at least a portion of at least one argument to the first command for invoking the first computer program on the system different from the data store to perform the first lifecycle operation on the data store;

invoking, via the first command with the at least one argument, the first computer program that, when executed, performs the first lifecycle operation on the data store; and executing the first computer program on the system different from the data store to perform the first lifecycle operation on the data store.

19. The method of claim 18, further comprising using the at least one computer hardware processor to perform:

receiving second user input from the user interface;

identifying in the second user input an indication of a second lifecycle operation corresponding to a second entry of the plurality of entries in the template, wherein the second entry is different from the first entry;

based on information in the second entry, identifying in the received user input a second configuration value associated with the second lifecycle operation;

formatting the second configuration value as at least a portion of at least one argument to a second command different from the first command; and invoking, via the first command with the at least one argument, a second computer program that, when executed, performs the second lifecycle operation on the data store.

20. The method of claim 18, wherein the first lifecycle operation is an operation that, when performed on the data store, creates, deletes, or alters one or more data structures used for managing data in the data store.

21. The method of claim 18, wherein data in the data store is managed at least in part by using a plurality of compressed blocks of data units and associated indexing information, and wherein the first computer program that, when executed, performs the first lifecycle operation on the data store based, at least in part, on the indexing information.

22. The method of claim 18, wherein the first lifecycle operation is a create table lifecycle operation, a delete table lifecycle operation, a create volume lifecycle operation, or a delete volume lifecycle operation.

23. At least one non-transitory computer-readable storage medium storing processor-executable instructions for execution on at least one computer hardware processor of a system for use with: (i) a data store; (ii) at least one computer program that, when executed, performs at least one lifecycle operation on the data store, the at least one computer program including a first computer program; and (iii) a template comprising a plurality of entries including a first entry, the system being different from the data store, the processor-executable instructions, when executed by the at least one computer hardware processor, cause the at least one computer hardware processor to perform:

receiving user input from a user interface;

identifying, in the received user input, an indication of a first lifecycle operation corresponding to the first entry in the template linking the first lifecycle operation to information used for generating a first command for invoking the first computer program that, when executed by the system different from the data store, operates on the data store and causes the first lifecycle operation to be performed on the data store, wherein the template includes a plurality of entries corresponding to a respective plurality of lifecycle operations, each of the plurality of lifecycle operations being a lifecycle operation for managing how data is structured in the data store by creating, deleting, or altering one or more data structures used for managing data in the data store, based on information in the first entry, identifying in the received user input at least one configuration value associated with the first lifecycle operation;

indirectly invoking performance of the first lifecycle operation on the data store at least in part by:

formatting the at least one configuration value as at least a portion of at least one argument to the first command for invoking the first computer program on the system different from the data store to perform the first lifecycle operation on the data store;

invoking, via the first command with the at least one argument the first computer program that, when executed, performs the first lifecycle operation on the data store; and executing the first computer program on the system different from the data store to perform the first lifecycle operation on the data store.

24. The at least one non-transitory computer-readable storage medium of claim 23, wherein the first lifecycle operation is a create table lifecycle operation, a delete table lifecycle operation, a create volume lifecycle operation, or a delete volume lifecycle.

25. The at least one non-transitory computer-readable storage medium of claim 23, wherein the first lifecycle operation is an operation that, when performed on the data store, creates, deletes, or alters one or more data structures used for managing data in the data store.

26. A method for performing one or more lifecycle operations on at least one data store in a data management system, the at least one data store comprising a first data store configured in accordance with a first data management scheme, and second data store configured in accordance with a second data management scheme different from the first data management scheme, the method comprising:

using at least one computer hardware processor to perform:

receiving first user input comprising information identifying a first lifecycle operation to perform on the first data store;

accessing information in a first template based at least in part on the information identifying the first lifecycle operation, wherein the first template links information identifying the first lifecycle operation to information used for generating a first command for invoking a first computer program that, when executed by a system different from the first data store, performs the first lifecycle operation on the first data store in accordance with the first data management scheme, wherein the first lifecycle operation comprises an operation that, when performed on the first data store, manages the way in which data is structured in the data store by creating, deleting, or altering one or more data structures used for managing data in the first data store;

indirectly invoking performance of the first lifecycle operation on the first data store at least in part by:

generating, based at least in part on the accessed information in the first template, the first command for invoking the first computer program on the system different from the first data store to perform the first lifecycle operation on the first data store, the first command comprising a reference to the first computer program, and a first argument for the first command to provide to the first computer program;

executing the first command to invoke the first computer program with the first argument to perform the first lifecycle operation on the first data store; and executing the first computer program on the system different from the first data store to perform the first lifecycle operation on the first data store.

27. The method of claim 26, further comprising:

receiving second user input comprising information identifying the first lifecycle operation to perform on the second data store;

accessing information in a second template based at least in part on the information identifying the first lifecycle operation, wherein the second template links information identifying the second lifecycle operation to information used for generating a second command for invoking a second computer program that, when executed, performs the second lifecycle operation on the second data store in accordance with the second data management scheme;

generating, based at least in part on the accessed information in the second template, the second command for invoking the second computer program, the second command comprising a reference to the second computer program, and a second argument for the second command to provide to the second computer program; and executing the second command to invoke the second computer program with the second argument to perform the first lifecycle operation on the data store.

28. The method of claim 27, wherein the first computer program is different from the second computer program.

29. The method of claim 26, wherein data in the first data store is managed in accordance with the first data management scheme at least in part by storing and indexing the data in the first data store based at least in part on a first key field of the data in the first data store.

30. The method of claim 29, wherein data in the second data store is managed in accordance with the second data management scheme at least in part by storing and indexing the data in the second data store based at least in part on a second key field of the data in the second data store.

31. The method of claim 30, wherein the data in the second data store includes at least some of the data in the first data store.

32. The method of claim 31, wherein the first key field is different from the second key field.

33. At least one non-transitory computer readable storage medium storing processor executable instructions that, when executed by at least one computer hardware processor, cause the at least one computer hardware processor to perform a method for performing one or more lifecycle operations on at least one data store in a data management system, the at least one data store comprising a first data store configured in accordance with a first data management scheme, and second data store configured in accordance with a second data management scheme different from the first data management scheme, the method comprising:

receiving first user input comprising information identifying a first lifecycle operation to perform on the first data store;

accessing information in a first template based at least in part on the information identifying the first lifecycle operation, wherein the first template links information identifying the first lifecycle operation to information used for generating a first command for invoking a first computer program that, when executed by a system different from the first data store, performs the first lifecycle operation on the first data store in accordance with the first data management scheme, wherein the first lifecycle operation comprises an operation that, when performed on the first data store, manages the way in which data is structured in the data store by creating, deleting, or altering one or more data structures used for managing data in the first data store;

indirectly invoking performance of the first lifecycle operation on the first data store at least in part by:

generating, based at least in part on the accessed information in the first template, the first command for invoking the first computer program on the system different from the first data store to perform the first lifecycle operation on the first data store, the first command comprising a reference to the first computer program, and a first argument for the first command to provide to the first computer program;

executing the first command to invoke the first computer program with the first argument to perform the first lifecycle operation on the first data store; and executing the first computer program on the system different from the first data store to perform the first lifecycle operation on the first data store.

34. The at least one non-transitory computer-readable storage medium of claim 33, wherein the method further comprises:

receiving second user input comprising information identifying the first lifecycle operation to perform on the second data store;

accessing information in a second template based at least in part on the information identifying the first lifecycle operation, wherein the second template links information identifying the second lifecycle operation to information used for generating a second command for invoking a second computer program that, when executed, performs the second lifecycle operation on the second data store in accordance with the second data management scheme;

generating, based at least in part on the accessed information in the second template, the second command for invoking the second computer program, the second command comprising a reference to the second computer program, and a second argument for the second command to provide to the second computer program; and executing the second command to invoke the second computer program with the second argument to perform the first lifecycle operation on the second data store.

35. A data management system, comprising:

a first data store configured in accordance with a first data management scheme;

a second data store configured in accordance with a second data management scheme different from the first data management scheme; and at least one computer hardware processor configured to perform:

receiving first user input comprising information identifying a first lifecycle operation to perform on the first data store;

accessing information in a first template based at least in part on the information identifying the first lifecycle operation, wherein the first template links information identifying the first lifecycle operation to information used for generating a first command for invoking a first computer program that, when executed by a system different from the data store, performs the first lifecycle operation on the first data store in accordance with the first data management scheme, wherein the first lifecycle operation comprises an operation that, when performed on the first data store, manages the way in which data is structured in the data store by creating, deleting, or altering one or more data structures used for managing data in the first data store;

indirectly invoking performance of the first lifecycle operation on the first data store at least in part by:

generating, based at least in part on the accessed information in the first template, the first command for invoking the first computer program on the system different from the first data store to perform the first lifecycle operation on the first data store, the first command comprising a reference to the first computer program, and a first argument for the first command to provide to the first computer program;

executing the first command to invoke the first computer program with the first argument to perform the first lifecycle operation on the first data store; and executing the first computer program on the system different from the first data store to perform the first lifecycle operation on the first data store.

* * * * *